(12) United States Patent
Takahashi

(10) Patent No.: US 11,568,619 B2
(45) Date of Patent: Jan. 31, 2023

(54) THREE-DIMENSIONAL SHAPE DATA EDITING DEVICE, AND NON-TRANSITORY COMPUTER READABLE MEDIUM STORING THREE-DIMENSIONAL SHAPE DATA EDITING PROGRAM

(71) Applicant: FUJIFILM Business Innovation Corp., Tokyo (JP)

(72) Inventor: Tomonari Takahashi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 475 days.

(21) Appl. No.: 16/734,383

(22) Filed: Jan. 5, 2020

(65) Prior Publication Data
US 2021/0065458 A1 Mar. 4, 2021

(30) Foreign Application Priority Data
Aug. 27, 2019 (JP) .............................. JP2019-154810

(51) Int. Cl.
*G06T 19/20* (2011.01)
*G06T 17/00* (2006.01)

(52) U.S. Cl.
CPC .............. *G06T 19/20* (2013.01); *G06T 17/00* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2005/0031186 A1* | 2/2005 | Luu | H01J 37/28 382/141 |
| 2006/0127854 A1* | 6/2006 | Wen | A61C 9/0053 433/213 |

FOREIGN PATENT DOCUMENTS

| | | |
|---|---|---|
| JP | 2000194881 | 7/2000 |
| JP | 2002149718 | 5/2002 |

* cited by examiner

*Primary Examiner* — Yi Wang
(74) *Attorney, Agent, or Firm* — JCIPRNET

(57) ABSTRACT

A three-dimensional shape data editing device including a processor configured to, with regard to an object represented by a first three-dimensional shape configured using multiple forming surfaces of at least one of flat surfaces and curved surfaces, a second three-dimensional shape in which the object is configured using multiple three-dimensional elements, and a third three-dimensional shape that is converted from the second three-dimensional shape such that the object is represented by the multiple forming surfaces, specify edge forming surfaces that correspond to edges of the object extracted from the first three-dimensional shape, with respect to the third three-dimensional shape, and configure the edge forming surfaces in the third three-dimensional shape such that shapes of the edges of the object represented by the first three-dimensional shape are reproduced.

20 Claims, 18 Drawing Sheets

THREE-DIMENSIONAL SHAPE DATA EDITING DEVICE, AND NON-TRANSITORY COMPUTER READABLE MEDIUM STORING THREE-DIMENSIONAL SHAPE DATA EDITING PROGRAM

CROSS-REFERENCE TO RELATED APPLICATIONS

This application is based on and claims priority under 35 USC 119 from Japanese Patent Application No. 2019-154810 filed Aug. 27, 2019.

BACKGROUND

(i) Technical Field

The present disclosure relates to a three-dimensional shape data editing device, and a non-transitory computer readable medium storing a three-dimensional shape data editing program.

(ii) Related Art

Japanese Unexamined Patent Application Publication No. 2000-194881 discloses an analysis model data creation method for creating analysis model data using an arithmetic unit, the method including: a shape data reading step for reading shape data in which the surface shape of an analysis target is defined; a voxel data dividing step for dividing the shape data read in the shape data reading step, into rectangular cuboid voxel data; a cutting plane defining step for defining a cutting plane along which cutting is carried out according to surfaces of the shape data for some or all of the voxel data obtained by the dividing in the voxel data dividing step; and a fit node defining step for defining, as fit nodes, intersecting points between the cutting plane of each voxel defined in the cutting plane defining step and the sides of the voxel in question.

Japanese Unexamined Patent Application Publication No. 2002-149718 discloses a voxel division processing method for dividing a CAD assembly model composed of multiple components into voxels, in which each component is divided into voxels with different voxel sizes being calculated for each component such that errors between the volume of the original shape of each component and the volume of the component in question after voxel division are constant for all components.

SUMMARY

When representing the three-dimensional shape of an object, three-dimensional shape data is sometimes used, which is defined by combining three-dimensional elements such as rectangular cuboids or cubes.

When a three-dimensional shape is represented by combining three-dimensional elements, the curved surface portions of an object are also represented by the three-dimensional elements, and it is therefore difficult to achieve a smooth surface compared to when the surface of an object including curved surface portions is represented by combining polygons having triangular shapes or the like.

Consequently, three-dimensional shape data composed of three-dimensional elements is sometimes converted into three-dimensional shape data composed of polygons. However, in a case where a conventional conversion method is used for this conversion, such as the MC (marching cubes) method in which contiguous flat surfaces are generated by applying polygons to the pattern of whether or not a three-dimensional element is present, the resulting shape may be different from the three-dimensional shape of the original object, with curved surface portions and uneven portions of the object being represented along the shape of the three-dimensional elements as they are, for example. This kind of situation is seen particularly at the edges of an object where the forming surfaces that form the surface of the object are connected at acute angles.

Aspects of non-limiting embodiments of the present disclosure relate to a three-dimensional shape data editing device, and a non-transitory computer readable medium storing a three-dimensional shape data editing program, with which, in a case where a three-dimensional shape of an object composed using three-dimensional elements is to be converted into a three-dimensional shape composed of polygons, the shape of the edges in the three-dimensional shape of the original object may be reproduced in the three-dimensional shape after conversion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a three-dimensional shape data editing device including a processor configured to, with regard to an object represented by a first three-dimensional shape configured using multiple forming surfaces of at least one of flat surfaces and curved surfaces, a second three-dimensional shape in which the object is configured using multiple three-dimensional elements, and a third three-dimensional shape that is converted from the second three-dimensional shape such that the object is represented by the multiple forming surfaces, specify edge forming surfaces that correspond to edges of the object extracted from the first three-dimensional shape, with respect to the third three-dimensional shape, and configure the edge forming surfaces in the third three-dimensional shape such that shapes of the edges of the object represented by the first three-dimensional shape are reproduced.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment will be described with reference to the drawings. It should be noted that the same constituent elements and the same processing is denoted by the same reference numbers in all the drawings, and redundant descriptions are omitted.

Figure 1:
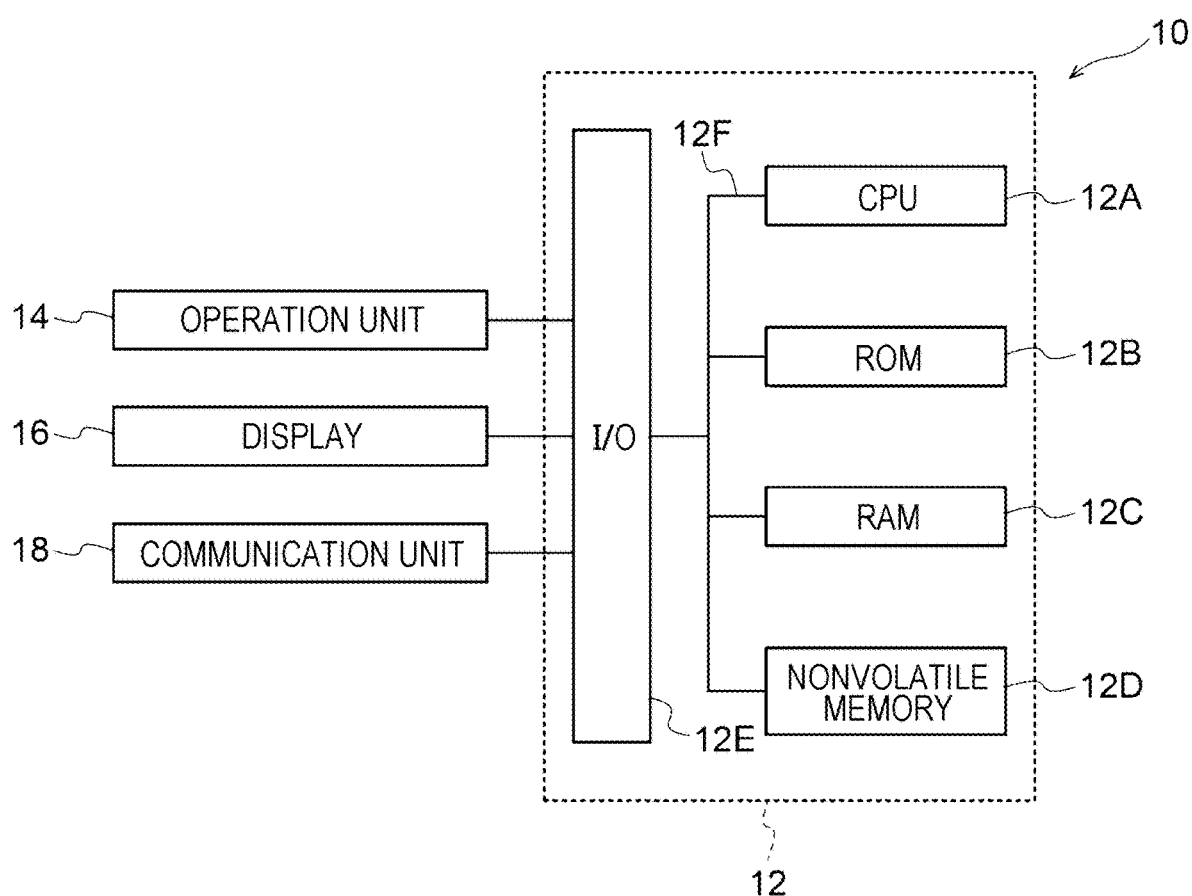
FIG. 1 is a drawing depicting an example of a configuration of an editing device.

First, a configuration of a three-dimensional shape data editing device 10 according to the present exemplary embodiment will be described with reference to FIG. 1.

The editing device 10 is constituted by a computer 12, for example. The computer 12 is provided with a CPU (central processing unit) 12A which is an example of a processor, a ROM (read only memory) 12B, a RAM (random access memory) 12C, a nonvolatile memory 12D, and an input/output interface (I/O) 12E. The CPU 12A, the ROM 12B, the RAM 12C, the nonvolatile memory 12D, and the I/O 12E are each connected via a bus 12F. Furthermore, an operation unit 14, a display 16, and a communication unit 18 are connected to the I/O 12E.

The nonvolatile memory 12D is an example of a storage device in which stored information is maintained even if the power supplied to the nonvolatile memory 12D is interrupted, and although a semiconductor memory is used, for example, a hard disk may be used. The nonvolatile memory 12D does not necessarily have to be housed within the computer 12, and may be a portable storage device that is attached to and detached from the computer 12 such as a memory card, for example.

The operation unit 14 is a function unit that receives instructions from a user of the editing device 10, and is configured including an input device such as a mouse, a keyboard, or a touch panel.

The display 16 is a function unit that displays information processed by the CPU 12A, and is configured including a display device such as a liquid crystal display or an organic EL (electroluminescence) display.

The communication unit 18 is connected to a communication line such as the Internet or a LAN (local area network), and has an interface for performing data communication with external devices connected to the communication line.

Figure 2:
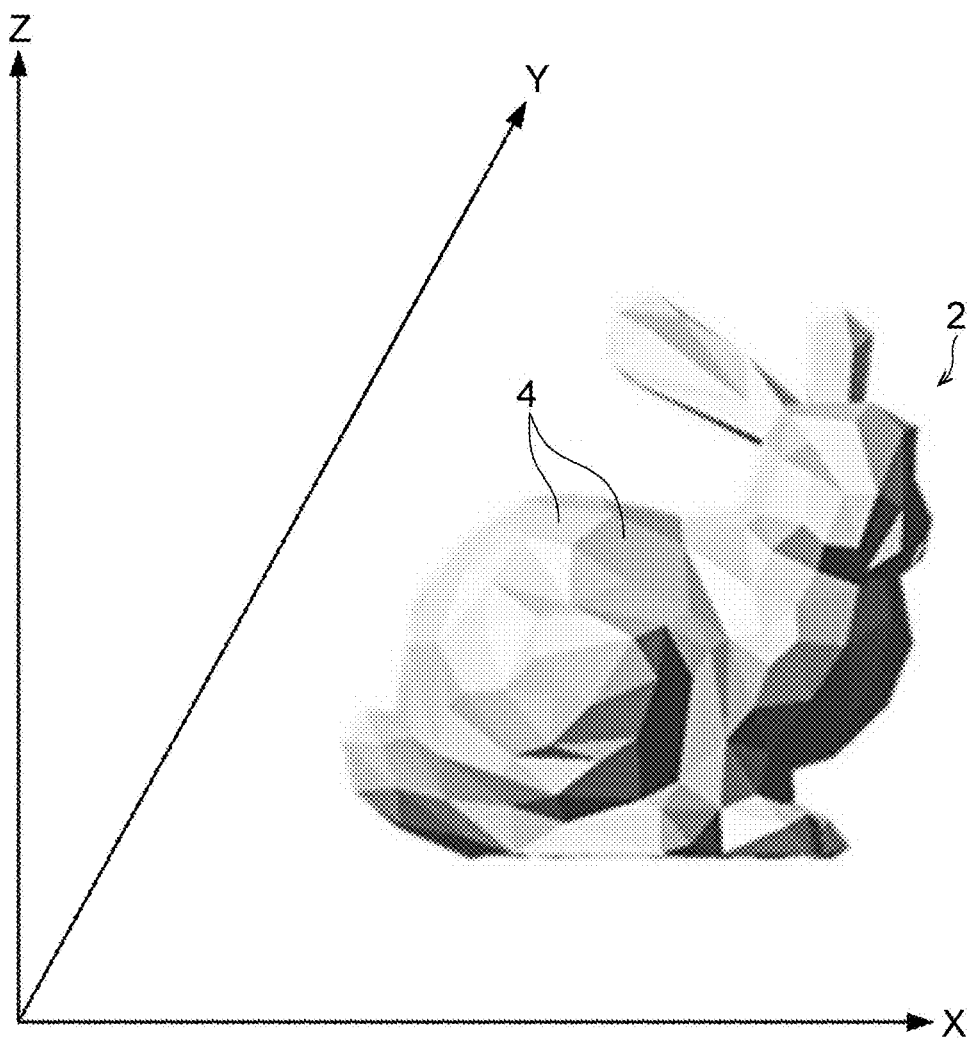
FIG. 2 is a drawing depicting an example of a three-dimensional shape of an object represented by polygons.

FIG. 2 is a drawing depicting an example of a three-dimensional shape of an object 2 represented by three-dimensional shape data. As depicted in FIG. 2, the editing device 10 represents the three-dimensional shape of the object 2 using XYZ coordinates represented by an X axis, Y axis, and Z axis. Hereinafter, the XYZ coordinates are referred to as "three-dimensional coordinate space" and the three-dimensional shape of the object 2 is simply referred to as the "shape of the object 2".

A data format in which polygons 4 are combined to constitute the surface of the object 2, for example, is sometimes used as a data format for three-dimensional shape data. It should be noted that a data format in which function curved surfaces such as spline curved surfaces or Bezier curved surfaces are combined to constitute the surface of the object 2 may be used other than polygons.

The polygons 4 are forming surfaces that are each a flat surface or a curved surface constituting the shape of the object 2. There are no restrictions to the shape of the polygons 4; however, polygons such as triangles or quadrilaterals are used, and the shape of the object 2 is constituted by combining multiple polygons 4. In other words, three-dimensional shape data in which the shape of the object 2 is defined using the polygons 4 includes information or the like relating to the location and arrangement direction of each of the polygons 4 and the connection with adjacent polygons 4, for example. Hereinafter, the three-dimensional shape of the object 2 will be simply referred to as the "shape of the object 2".

Three-dimensional shape data in which the object 2 is defined using polygons 4 only defines the shape of the object 2 and does not include information defining the internal structure of the object 2. However, in terms of the design of three-dimensional shape data, there are situations where it is desirable for not only the shape of the object 2 but also the internal structure of the object 2 to be defined by the editing device 10.

Consequently, the editing device 10 has a function that defines the shape of the object 2 using voxels 6, and defines the internal structure of the object 2 by editing the three-dimensional shape data defined by the voxels 6. Hereinafter, the object 2 composed of polygons 4, which is the origin for generating three-dimensional shape data of the object 2 composed of voxels 6, will be referred to as the "original object 2".

The voxels 6 are basic elements constituting the shape of the object 2 and the internal structure of the object 2, and square bodies are used therefor, for example. However, there is no restriction to square bodies and other three-dimensional elements may be used including polyhedrons such as rectangular cuboids, cones such as triangular pyramids, spheres, and columnar bodies such as prisms. In other words, the voxels 6 are an example of a three-dimensional element.

A desired shape of the object 2 is expressed by stacking the voxels 6. Furthermore, attributes representing properties of the voxels 6 such as color, strength, material, and texture may be set for each voxel 6. The color, material, and the like of the object 2 are expressed according to whether or not voxels 6 are present and the attributes of the voxels 6.

"Material" includes at least one type of information from among: information indicating the genre of the material such as resin, metal, or rubber; information indicating a material name such as ABS or PLA; information indicating a product name, a product number, or the like of a commercially available material; information indicating a material such as a material name, an abbreviation, or a number determined according to a standard such as ISO or JIS; and information indicating material characteristics such as thermal conductivity, electrical conductivity, or magnetism.

Furthermore, "texture" represents physical property information that is not merely color such as the reflectance, transmittance, gloss, and surface properties of the object 2, and the tactile feeling.

As mentioned above, the shape of the object 2 is represented by a set of voxels 6, and, to be specific, is represented by the element values of X, Y, and Z coordinates in the three-dimensional coordinate space, for example.

Figure 3:
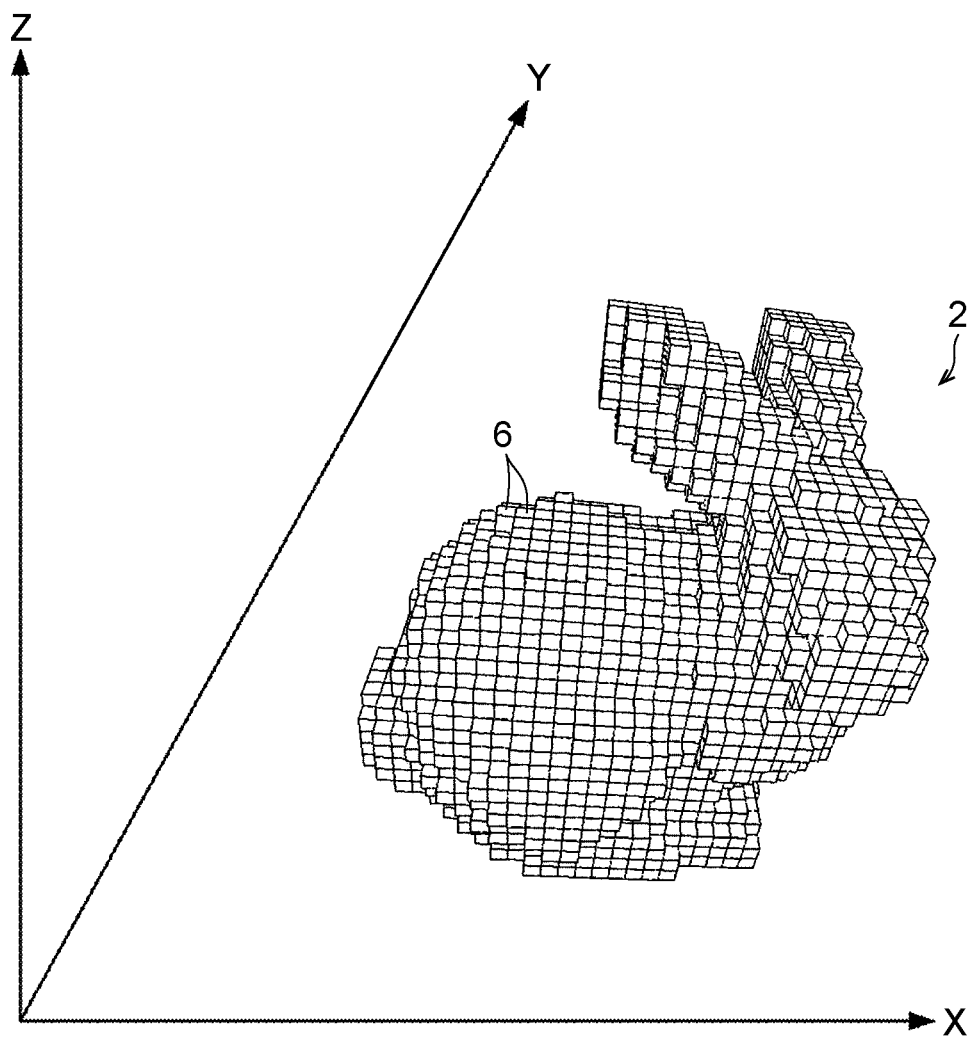
FIG. 3 is a drawing depicting an example of a three-dimensional shape of an object represented by voxels.

FIG. 3 is a drawing depicting an example of the shape of the object 2 represented by voxels 6. If coordinates in the three-dimensional coordinate space are represented as (X, Y, Z), the shape of the object 2 is represented by "(X, Y, Z)=1" when a voxel 6 is present at coordinates (X, Y, Z), and "(X, Y, Z)=0" when a voxel 6 is not present at coordinates (X, Y, Z), for example. In other words, three-dimensional shape data in which the shape of the object 2 is defined using voxels 6 includes the element values of coordinates (X, Y, Z) indicating whether or not a voxel 6 is present, and attributes associated with the voxels 6.

It should be noted that the shape of the object 2 does not necessarily have to be represented by coordinates (X, Y, Z) in three-dimensional coordinate space, and may be represented by index numbers uniquely associated with coordinates (X, Y, Z), for example. In this case, a value of "1" being associated with an index number indicates that a voxel 6 is present at the location represented by the index number, for example.

It should be noted that the three-dimensional coordinate space is not restricted to three-dimensional orthogonal coordinates such as X, Y, and Z, and polar coordinates using r and θ may be used, for example. In this case, similar to the three-dimensional coordinate space being represented by index numbers of 1, 2, 3, and so on for each pitch of X, Y, and Z, it is sufficient for index numbers to be associated with each pitch of r and θ, and for the presence of voxels 6 to be represented with values of 1 or more being designated for locations represented by the index numbers. It should be noted that if voxels 6 having respectively different shapes are associated with values of 1 or more, voxels 6 having shapes that correspond to the set values are arranged in designated locations in the three-dimensional coordinate space.

If the shape of the object 2 is configured using voxels 6 in this way, not only the shape of the object 2 but also the internal structure of the object 2 is defined by setting attributes to each voxel 6.

However, in a case where the shape of the object 2 is composed of voxels 6, it becomes easy for uneven portions to occur in the surface of the configured object 2, and it becomes difficult for the shape of the object 2 to be brought close to the shape of the original object 2 compared to the case where the object 2 is composed using polygons 4. In particular, the edges 8 of the object 2 have various angles, and therefore differences between the shapes of the edges 8 in the object 2 composed of voxels 6 and the shapes of the edges 8 in the original object 2 are notable compared to other portions. This point will be described hereinafter.

Figure 4:
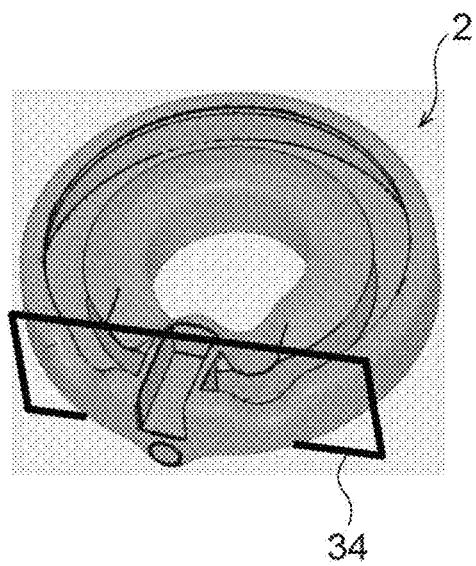
FIG. 4 is a drawing depicting an example of a three-dimensional shape of an original object.

FIG. 4 is a drawing depicting an example shape of the original object 2 composed of polygons 4, which is the origin for generating three-dimensional shape data of the object 2 composed of voxels 6.

Figure 5:
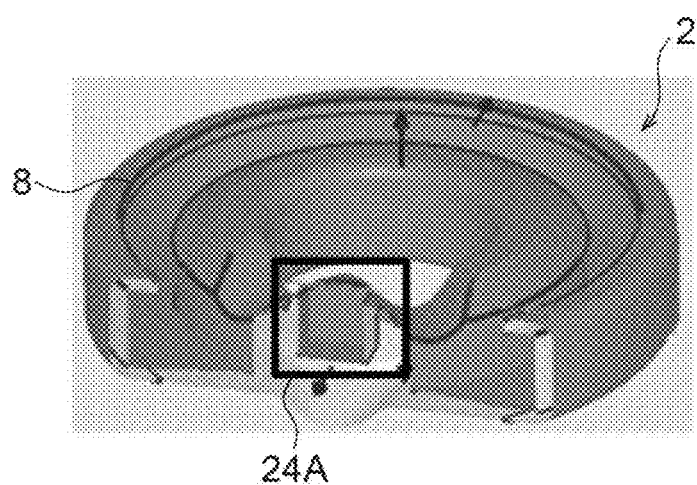
FIG. 5 is a cross-sectional view depicting an example of a cross section of the original object.

FIG. 5 is a cross-sectional view depicting an example of a cross section in a case where the original object 2 depicted in FIG. 4 is cut along a plane 34. The section indicated by a thick line in FIG. 5 is a section indicating an edge 8 of the original object 2.

Figure 6:
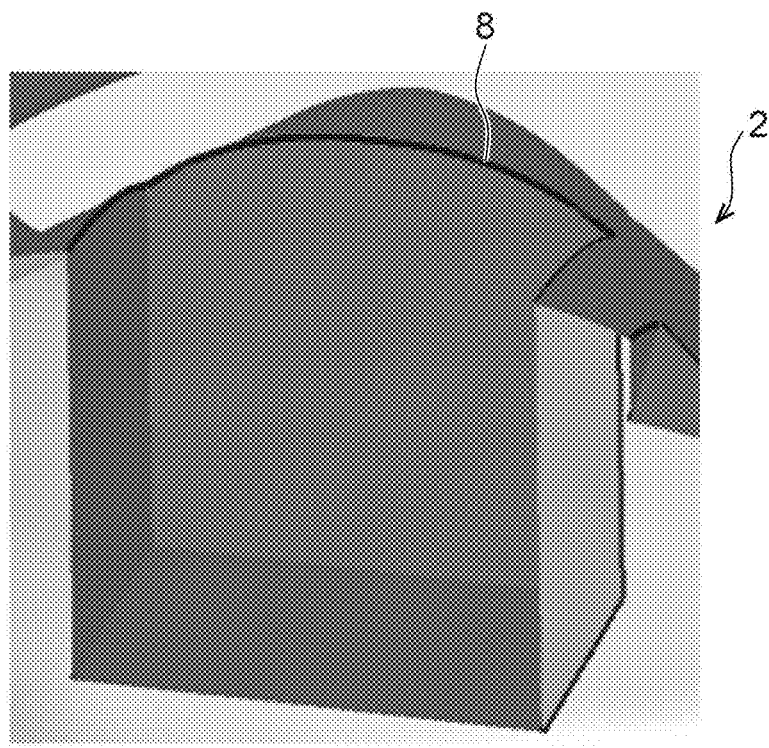
FIG. 6 is an enlarged view in which the example of the cross section of the original object is enlarged.

FIG. 6 is an enlarged view showing an enlarged depiction of a cross section of the range indicated by a region 24A, out of the cross section of the original object 2 depicted in FIG. 5.

Figure 7:
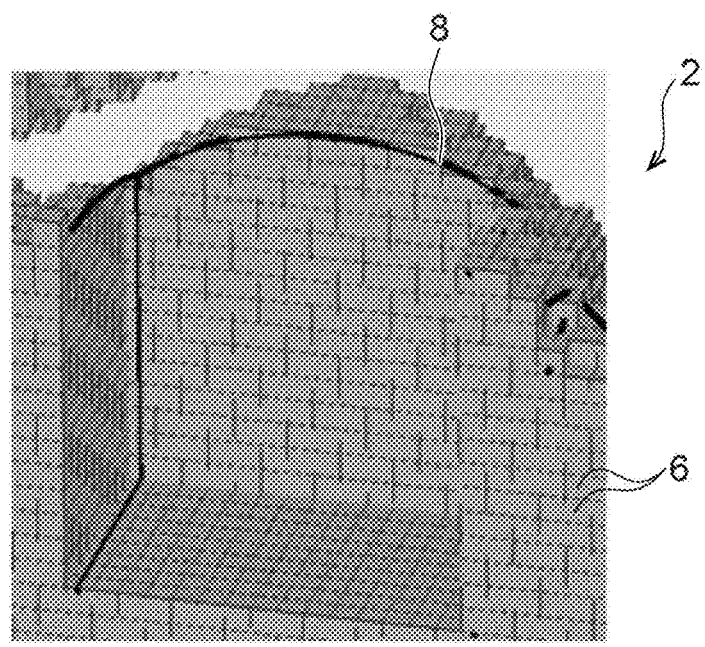
FIG. 7 is a cross-sectional view depicting the example of the cross section in a pre-conversion object in which the shape of the original object is composed of voxels.

In contrast, FIG. 7 is an example of a cross-sectional view showing an enlarged depiction of a cross section of a range that is the same as the range indicated by the region 24A in FIG. 5, in the shape of the object 2 in which the shape of the original object 2 depicted in FIG. 4 is composed of voxels 6. As depicted in FIG. 7, in a case where three-dimensional elements that do not have curves such as cubes are used as voxels 6, when attempting to subdivide the size of the voxels 6 to be small, it is possible to get close to the shape of the edge 8 represented by a curve but it is not possible to reproduce the shape of the edge 8. Reproducing the shape of an edge 8 refers to generating three-dimensional shape data that represents the same shape as the shape of the edge 8 that is to be reproduced. Furthermore, even in a case where three-dimensional elements having curved surfaces such as spheres are used as voxels 6, the curvature of the curved surfaces of the voxels 6 does not always match the curvature of edges 8 represented by curved lines, and therefore it is possible to get close to the shapes of the edges 8 but it is not possible to reproduce the shapes of the edges 8.

Furthermore, there are conventional conversion methods such as the MC (marching cubes) method with which the three-dimensional shape of an object 2 composed of voxels 6 is converted into a three-dimensional shape composed of polygons 4; however, it is not possible to reproduce the edges of the object 2 where the forming surfaces that form the surface of the object 2 are connected at acute angles.

Figure 8:
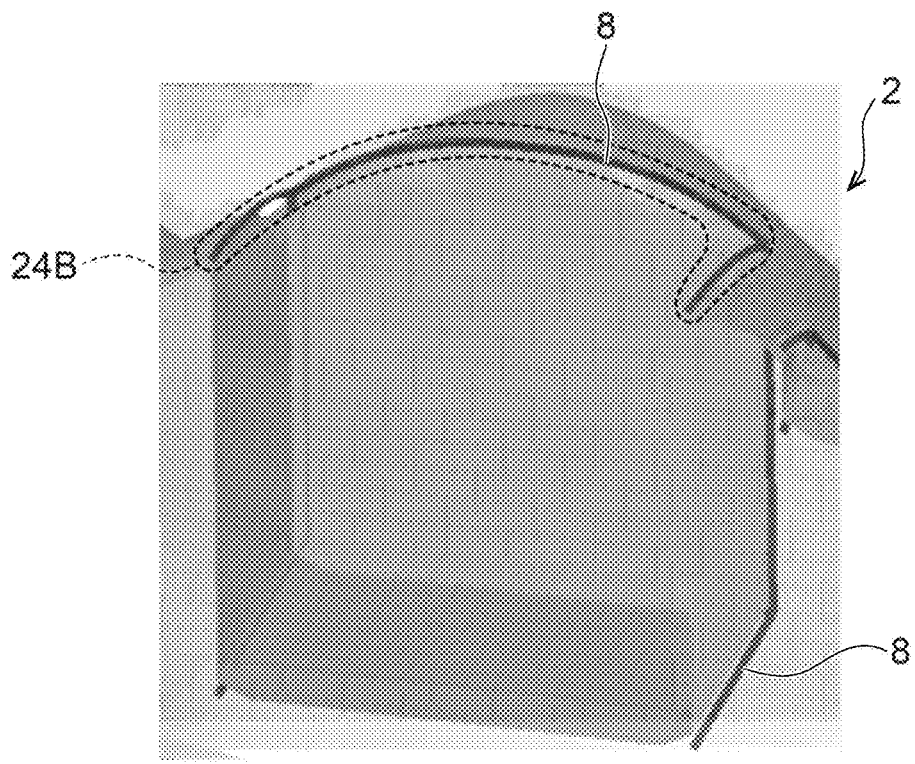
FIG. 8 is a cross-sectional view depicting the example of the cross section in a case where the original object and the pre-conversion object are superposed.

Consequently, as depicted in FIG. 8, in a case where the shape of the object 2 composed of voxels 6 depicted in FIG. 7 is converted into a three-dimensional shape composed of polygons 4, there occurs a difference between the shape of the edge 8 of the original object 2 in a region 24B and the shape of the object 2 composed of polygons 4 corresponding to the edge 8. It should be noted that the edge 8 in FIG. 8 represents an edge 8 of the original object 2 depicted in FIG. 6.

In contrast, for example, if three-dimensional shape data of the original object 2 and three-dimensional shape data of the object 2 composed of voxels 6, which is created from the three-dimensional shape data of the original object 2, are both stored in the nonvolatile memory 12D of the editing device 10, the optimum three-dimensional shape data can be used in accordance with the use such that the three-dimensional shape data of the original object 2 composed of polygons 4 is used when the shape of the object 2 is to be depicted and the three-dimensional shape data of the object 2 composed of voxels 6 is used when the internal structure of the object 2 is to be depicted.

However, in this case it is necessary for two types of three-dimensional shape data for the same object 2 to be stored in the nonvolatile memory 12D, and the amount of data stored increases compared to the case where either item of three-dimensional shape data is stored in the nonvolatile memory 12D. Furthermore, in a case where the shape of the object 2 is edited by the editing device 10 using one item of three-dimensional shape data, the shape of the object 2 represented by the other item of three-dimensional shape data also has to be edited in conjunction therewith, and this requires complex processing.

Consequently, hereinafter, a description will be given regarding processing of the editing device 10 with which the shape of an edge 8 in the original object 2 is reproduced even if only three-dimensional shape data of the object 2 composed of voxels 6 is stored in the nonvolatile memory 12D and the three-dimensional shape data composed of voxels 6 is converted into three-dimensional shape data defined by polygons 4.

Figure 9:
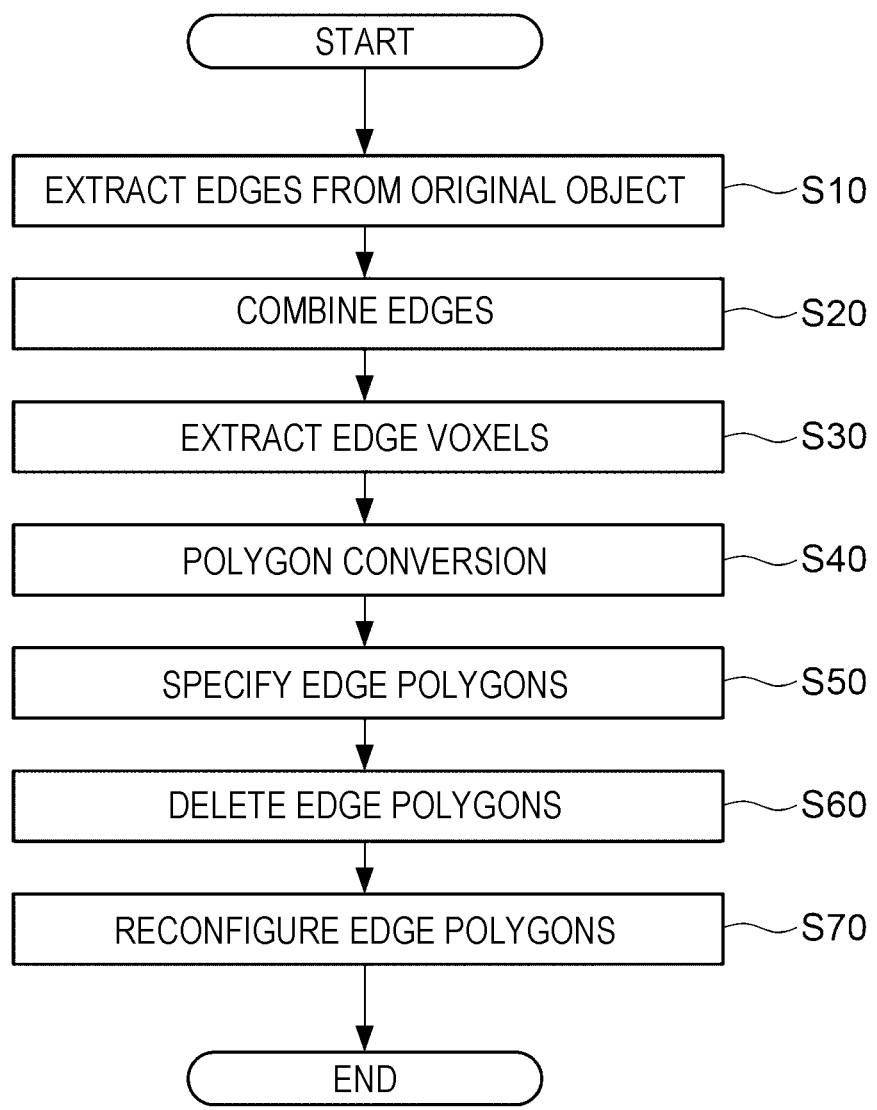
FIG. 9 is a flowchart depicting an example of the flow of polygon conversion processing.

FIG. 9 is a flowchart depicting an example of the flow of polygon conversion processing executed by the CPU 12A of the editing device 10 in a case where three-dimensional shape data representing the shape and internal structure of the original object 2 composed using voxels 6 is converted into three-dimensional shape data defined using polygons 4.

It should be noted that, for the convenience of the description hereinafter, "pre-conversion object 2" will be used to refer to the object 2 represented by three-dimensional shape data representing the shape and internal structure of the original object 2, which is composed using voxels 6, and "post-conversion object 2" will be used to refer to the object 2 composed using polygons 4, which is obtained by converting three-dimensional shape data representing the pre-conversion object 2. Furthermore, three-dimensional shape data of the original object 2 is stored in the RAM 12C of the editing device 10. The three-dimensional shape data of the original object 2 may be deleted from the RAM 12C at the point in time at which step S10 of the polygon conversion processing depicted in FIG. 9 ends. Alternatively, if edges 8 are extracted from the three-dimensional shape data of the original object 2 and stored in the RAM 12C in advance, the three-dimensional shape data of the original object 2 is no longer required for the polygon conversion processing depicted in FIG. 9, and therefore step S10 of the polygon conversion processing is not required.

An editing program that specifies the polygon conversion processing depicted in FIG. 9 is stored in advance in the ROM 12B of the editing device 10, for example. The CPU 12A of the editing device 10 reads the editing program stored in the ROM 12B and executes the polygon conversion processing.

In step S10, the CPU 12A extracts edges 8 from the original object 2. Specifically, from among the angles formed by adjacent polygons 4 of the original object 2, locations where an internal angle inside the original object 2 is less than or equal to a first reference angle are deemed to be edges 8 of the original object 2 by the CPU 12A and are extracted.

For example, an angle of the range from 140 to 160 degrees is used as the first reference angle; however, there is no restriction thereto and a user may operate the operation unit 14 while confirming extraction results for edges 8 and alter the first reference angle such that edges 8 of interest to the user are extracted. Furthermore, the CPU 12A may calculate the angle of an edge 8 in the original object 2 in a location designated by the user, from the three-dimensional shape data of the original object 2, and set the calculated angle of the edge 8 as the first reference angle. Furthermore, the CPU 12A may use the three-dimensional shape data of the original object 2 to calculate at least one out of the distribution and the deviation of the angles formed by each of the polygons 4 constituting the original object 2, and set such as the first reference angle. Specifically, the first reference angle may be set as an angle with which there are included locations for X % (X being a positive real number) of the entirety in the direction in which the angle increases, or an angle with which the deviation is Z (Z being a real number), from among the locations where angles are measured, for example.

In addition, the CPU 12A may set the first reference angle for each range designated by the user in the original object 2, and extract an edge 8 for each range in accordance with the first reference angle set to each range. In a case where the user does not designate a range, the CPU 12A may divide the original object 2 using an octree, and may divide the distribution of angles formed by each of the polygons 4 constituting the original object 2 into multiple groups and use a set of locations having angles included in a divided group as a divided range of the original object 2.

Figure 10:
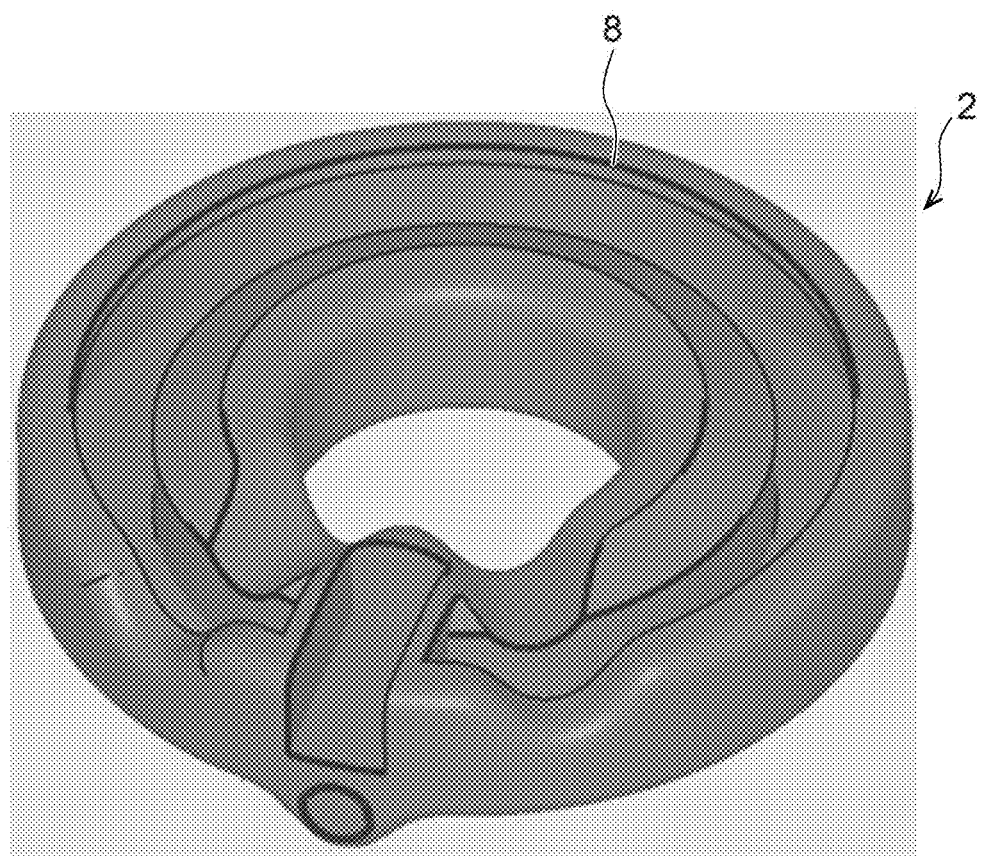
FIG. 10 is a drawing depicting an example of edges extracted from the original object when a first reference angle is set to 160 degrees.
Figure 11:
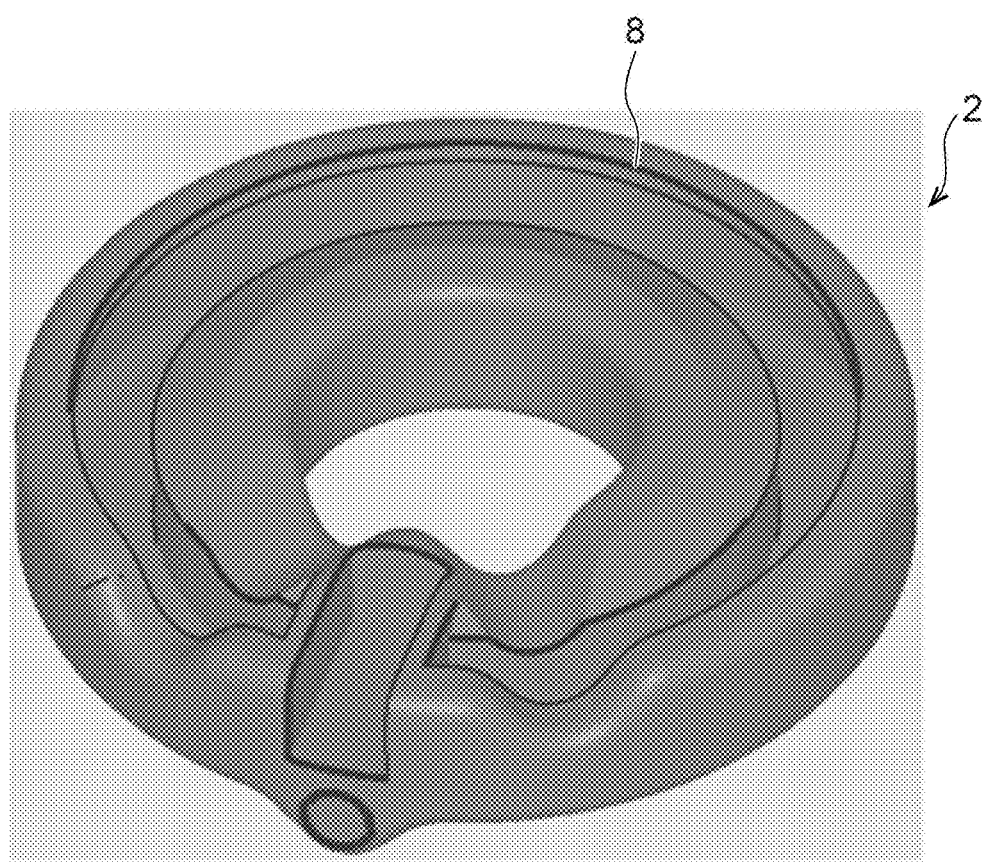
FIG. 11 is a drawing depicting an example of edges extracted from the original object when the first reference angle is set to 120 degrees.
Figure 12:
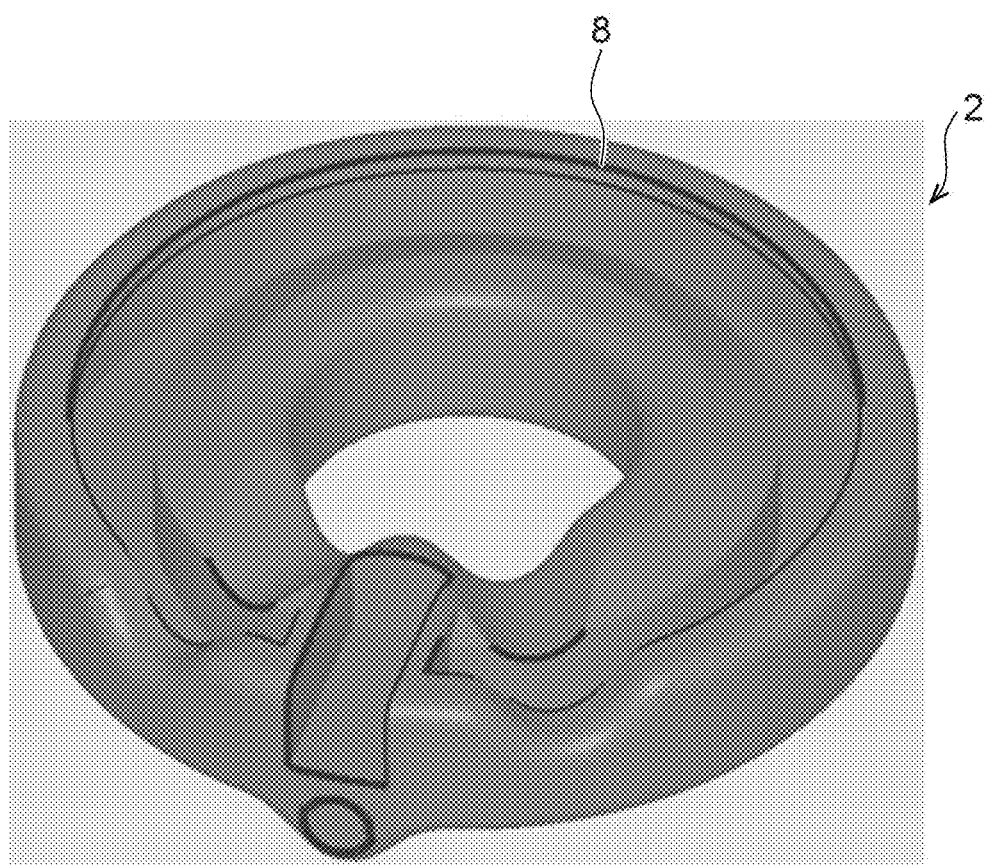
FIG. 12 is a drawing depicting an example of edges extracted from the original object when the first reference angle is set to 90 degrees.

FIGS. 10 to 12 are drawings depicting examples of extraction results obtained by extracting edges 8 from the original object 2 depicted in FIG. 4. From thereamong, FIG. 10 depicts an example of the edges 8 extracted when the first reference angle is set to 160 degrees, and FIG. 11 depicts an example of the edges 8 extracted when the first reference angle is set to 120 degrees. Furthermore, FIG. 12 is a drawing depicting an example of the edges 8 extracted when the first reference angle is set to 90 degrees. Setting the first reference angle to be smaller results in less edges 8 being extracted and only edges 8 having a sharper change in angle being extracted.

However, in a case where the original object 2 has a complex shape in which multiple edges 8 intersect and the curvature of the edges 8 continuously changes, contiguous edges 8 may be cut into smaller segments and extracted.

Consequently, in step S20, the CPU 12A combines edges 8 estimated to have originally been contiguous edges 8 from among the edges 8 extracted in step S10.

Specifically, in a case where external angles formed by adjacent edges 8 intersect at a preset second reference angle or less, the CPU 12A deems the adjacent edges 8 to have originally formed one contiguous edge 8 and combines them.

Here, an external angle formed by adjacent edges 8 refers to an angle formed at the exterior of the original object 2 by extension lines that extend the adjacent edges 8. Furthermore, the second reference angle is an angle serving as a reference for determining whether or not adjacent edges 8 are one contiguous edge 8.

Similar to the first reference angle, the second reference angle is also not restricted to a set value, and a user may operate the operation unit 14 while confirming results for combining edges 8 and alter the second reference angle such that edges 8 of interest to the user are combined as expected. Furthermore, similar to the first reference angle, for the second reference angle also, the CPU 12A may set the external angle of adjacent edges 8 designated by the user as the second reference angle, and may set the second reference angle using at least one out of the distribution and the deviation of external angles formed by adjacent edges 8. In addition, the CPU 12A may set a second reference angle for each range designated by the user in the original object 2, and combine edges 8 in each range in accordance with the second reference angle set to each range.

Figure 13:
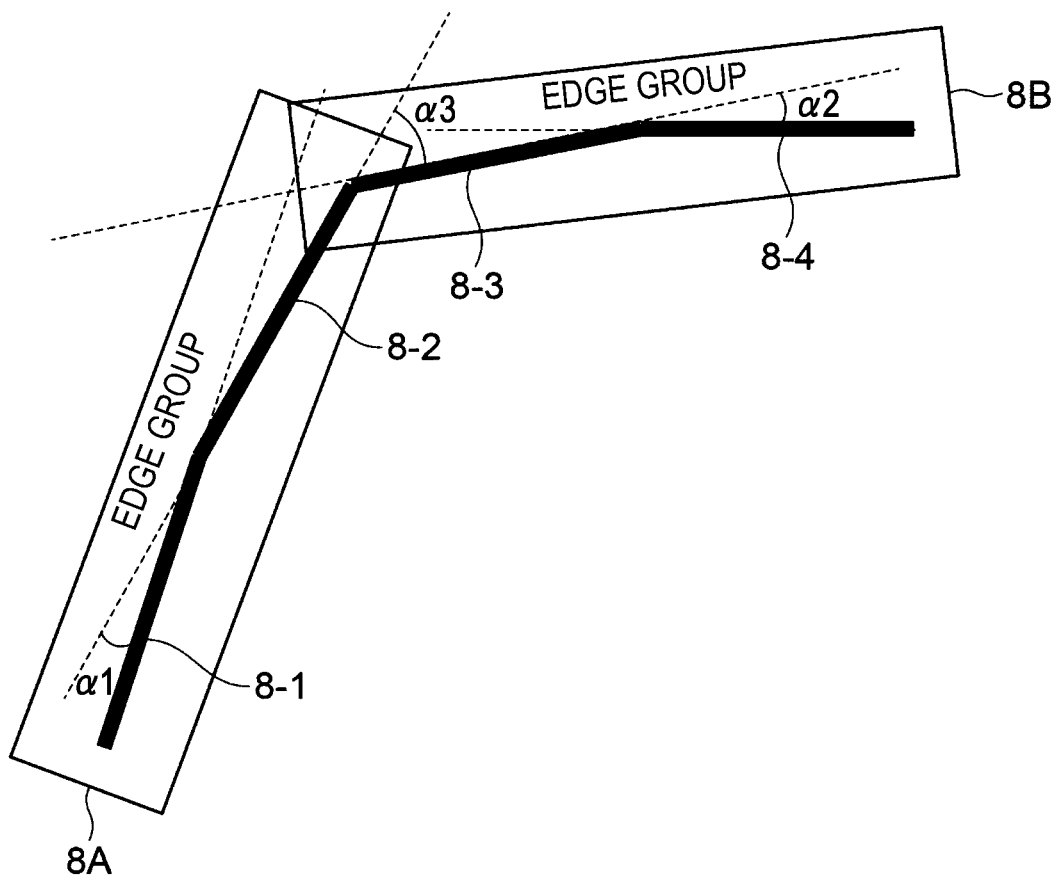
FIG. 13 is a drawing depicting an example of edges being combined.

FIG. 13 is a drawing describing the combining of extracted edges 8. In FIG. 13, edges 8-1, 8-2, 8-3, and 8-4 are edges 8 that are extracted by the CPU 12A as respectively different edges 8. For the convenience of the description, in a case where it is necessary to distinguished between edges 8 when describing them, sub-reference numbers "-N" (N being a positive integer) are assigned to each edge 8 as depicted in FIG. 13.

An external angle $\alpha1$ formed by edges 8-1 and 8-2 and an external angle $\alpha2$ formed by edges 8-3 and 8-4 are both less than or equal to the second reference angle, and an external angle $\alpha3$ formed by edges 8-2 and 8-3 is greater than the second reference angle. In this case, edges 8-1 and 8-2 form an edge group 8A and are combined as one contiguous edge 8, and edges 8-3 and 8-4 form an edge group 8B and are combined as one contiguous edge 8. In this way, the connecting points between edges 8 are referred to as intersecting points between edges 8.

Figure 14:
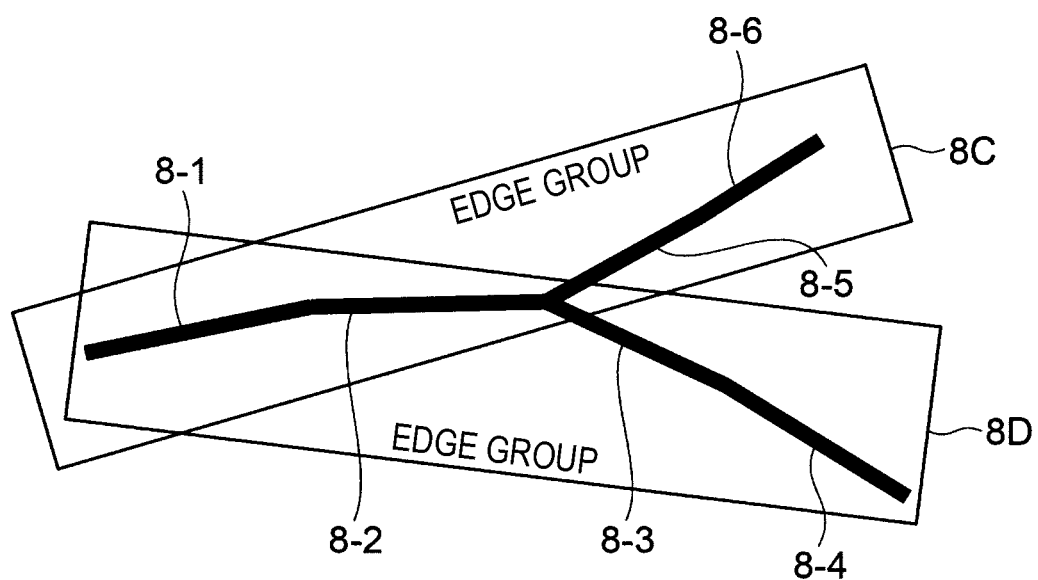
FIG. 14 is a drawing depicting an example of edges that are branches being combined.

It should be noted that, as depicted in FIG. 14, in a case where adjacent edges 8 branch with the external angle formed being less than or equal to the second reference angle, the CPU 12A may select either of the branching edges 8 as a contiguous edge 8. Looking at the example in FIG. 14, in a case where edges 8-3 and 8-5 are present adjacent to edge 8-2 with the external angles both being less than or equal to the second reference angle, the CPU 12A may include edge 8-5 in edge group 8C together with edge 8-2, and may include edge 8-3 in edge group 8D together with edge 8-2.

A selection method for selecting the edge 8 with which it is first determined that the external angle is less than or equal to the second reference angle, a selection method for selecting the edge 8 with which the length of the edge 8 becomes the longest out of the branching edges 8, a selection method for selecting the edge 8 with which the external angle formed is the smallest out of the branching edges 8, or the like is used as a method for determining which of the branching edges 8 is to be selected as one contiguous edge 8.

In step S30, the CPU 12A superposes the edges 8 combined in step S20 and the pre-conversion object 2, and extracts all voxels 6 corresponding to the edges 8 from the voxels 6 constituting the pre-conversion object 2.

The voxels 6 corresponding to the edges 8 are voxels 6 representing the edges 8 of the original object 2 in the pre-conversion object 2, and refer to voxels 6 where the edges 8 touch and voxels 6 where the edges 8 pass through the inside. An edge 8 passing through the inside of a voxel 6 includes not only a state where an edge 8 passes through a voxel 6 but also a state where an endpoint of an edge 8 remains inside a voxel 6. Furthermore, an edge 8 may not touch or pass through a voxel 6 directly, and, for example, voxels 6 included within a predetermined range from voxels 6 where an edge 8 touches or passes through may also be treated as voxels 6 corresponding to an edge 8. Specifically, voxels 6 included in a range of up to M voxels that are contiguous from a voxel 6 where an edge 8 touches or passes through are treated as voxels 6 corresponding to the edge 8 (M being a natural number, and the range being in the neighborhood of M). It should be noted that it is sufficient for the value M to be set by the user.

A publicly-known distance measurement method or intersection determination method is used to determine an edge 8 touching or passing through a voxel 6. For example, it is sufficient for the CPU 12A to generate points on edges 8 at intervals less than or equal to the distance between the centers of adjacent voxels 6 (voxel pitch) constituting the pre-conversion object 2, and determine that an edge 8 touches or passes through a voxel 6 from the positional relationship between the generated points and the voxels 6.

In this case, the CPU 12A may determine whether an edge 8 touches or passes through a voxel 6 assuming that the size of a voxel 6 is greater than the actual size. Alternatively, it may be determined that an edge 8 touches or passes through a voxel 6 in a case where the distance from the center of a voxel 6 to an edge 8 is less than or equal to a threshold value that is determined in advance so as to be half of the voxel pitch, for example. Alternatively, the inner products of a vector of an edge 8 and vectors to each vertex of a voxel 6 having the same starting point may be calculated, and it may be determined whether the edge 8 touches or passes through the voxel 6 in accordance with whether or not the signs of the inner products are consistent.

Hereinafter, from among the voxels 6 constituting the pre-conversion object 2, voxels 6 that correspond to edges 8 will be referred to as "edge voxels 6A" in particular. An edge voxel 6A is an example of an edge three-dimensional element.

Figure 15:
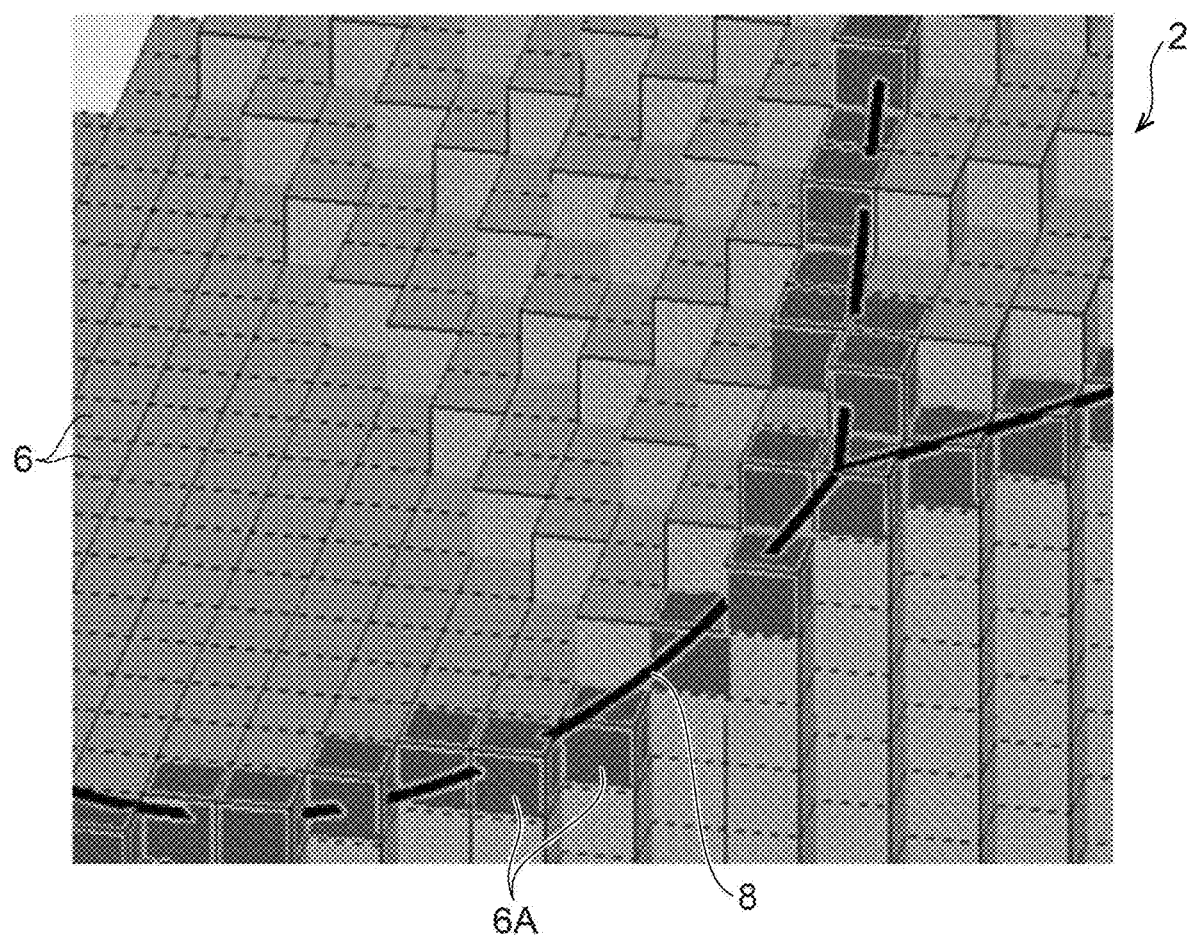
FIG. 15 is a drawing depicting an example of edge voxels.

FIG. 15 is a drawing depicting an example of edge voxels 6A. As mentioned above, voxels 6 that correspond to edges 8 are edge voxels 6A.

In step S40, the CPU 12A converts three-dimensional shape data representing the pre-conversion object 2 composed of voxels 6 into three-dimensional shape data composed of polygons 4. This conversion is referred to as a "polygon conversion", and an object 2 represented by three-dimensional shape data generated by the conversion is the post-conversion object 2.

A publicly-known conversion method such as the MC (marching cubes) method in which contiguous flat surfaces are generated by applying polygons 4 to the pattern of the whether or not voxels 6 are present is used for the polygon conversion, for example. When executing the polygon conversion, the CPU 12A generates correspondence information regarding the correspondence between polygons 4 and voxels 6, which indicates the voxels 6 constituting the pre-conversion object 2 from which the polygons 4 constituting the post-conversion object 2 have been converted.

In step S50, the CPU 12A refers to the generated correspondence information and specifies the polygons 4 that have been converted from the edge voxels 6A (hereinafter referred to as "edge polygons 4A") from among the polygons 4 constituting the post-conversion object 2. An edge polygon 4A is an example of an edge forming surface.

Figure 16:
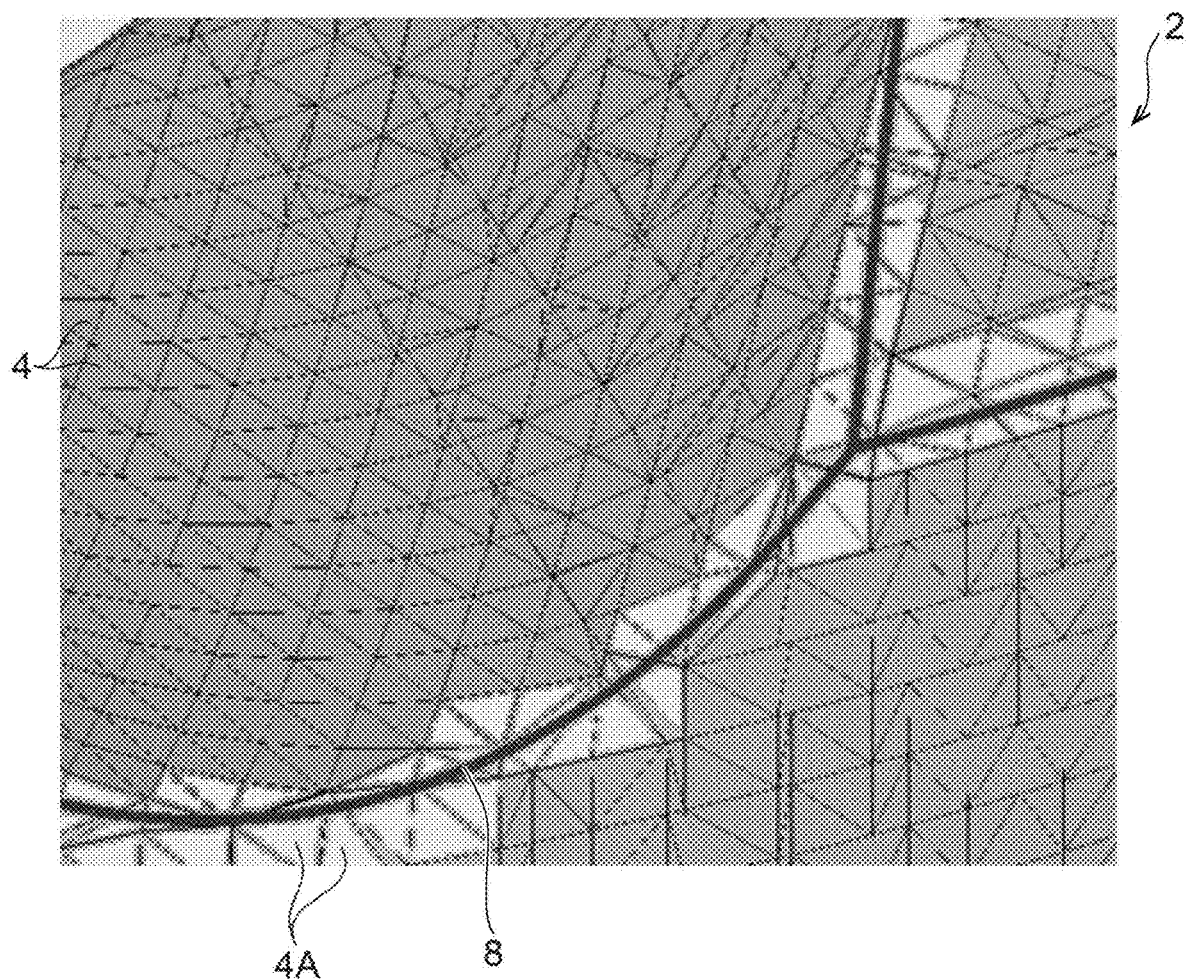
FIG. 16 is a drawing depicting an example of edge polygons in a post-conversion object.

FIG. 16 is a drawing depicting an example of edge polygons 4A in the post-conversion object 2. As depicted in FIG. 16, it is clear that the edge polygons 4A have been specified along edges 8.

In step S60, the CPU 12A deletes the edge polygons 4A specified in step S50, from the polygons 4 constituting the post-conversion object 2 generated in step S40.

Figure 17:
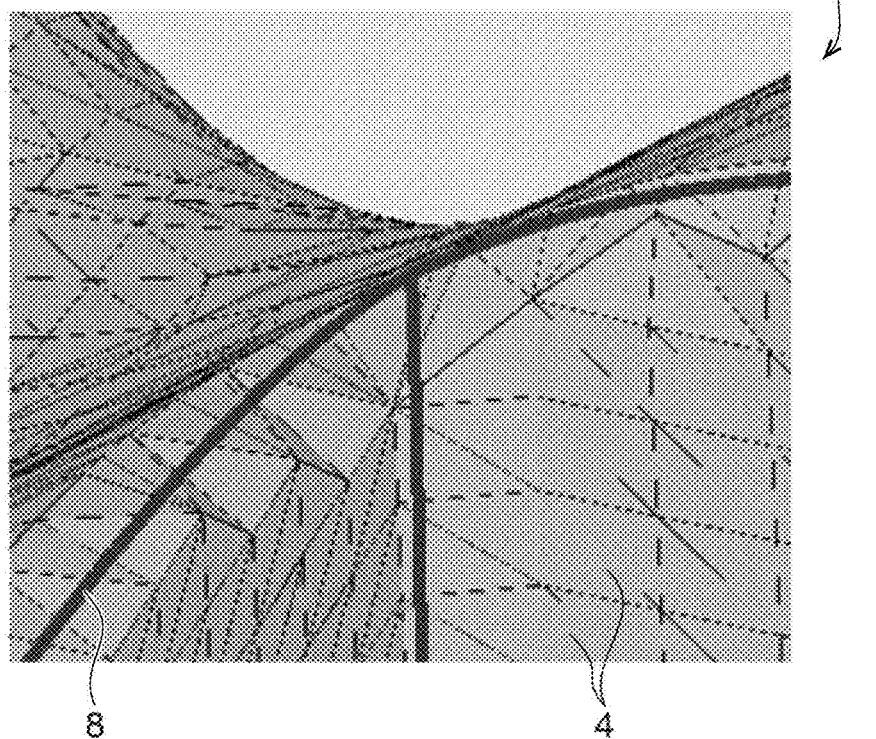
FIG. 17 is a drawing depicting an example of the post-conversion object.
Figure 18:
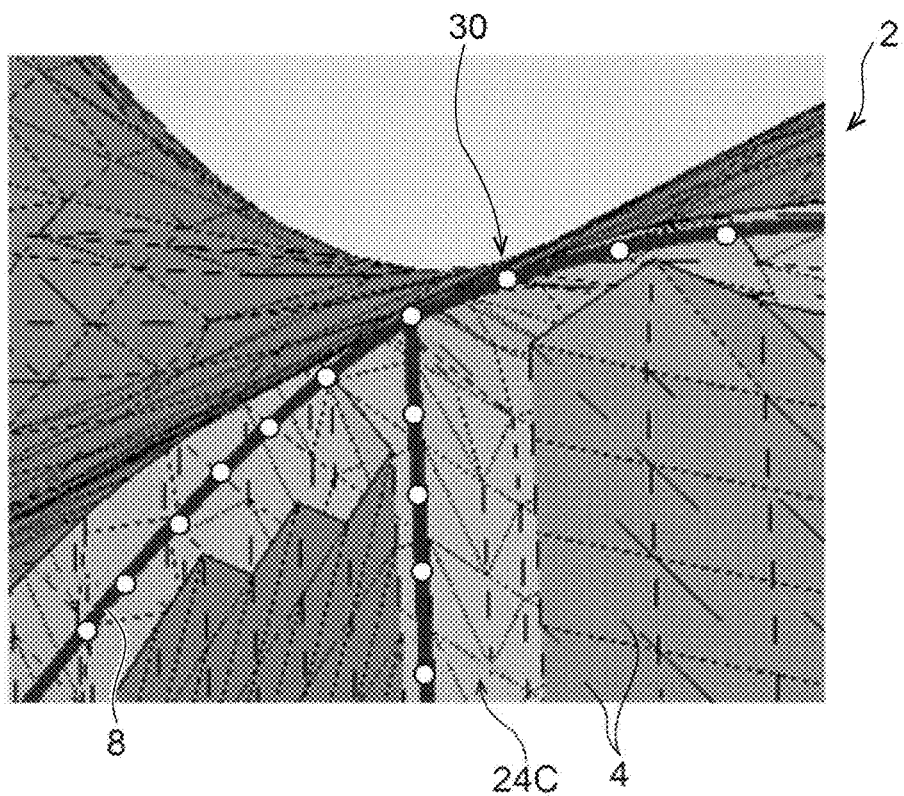
FIG. 18 is a drawing depicting an example of a state after edge polygons have been deleted from the post-conversion object.

FIG. 18 is a drawing depicting a state after the edge polygons 4A have been deleted from the post-conversion object 2 depicted in FIG. 17. A region 24C in FIG. 18 corresponds to a location where edge polygons 4A have been deleted.

In step S70, the CPU 12A arranges multiple points on the edges 8, and arranges new polygons 4 connecting the points arranged on the edges 8 and locations where vertices 22 of the edge polygons 4A deleted in step S60 were present, thereby reconfiguring the edge polygons 4A of the post-conversion object 2.

The vertexes of the newly arranged polygons A are located at the respective points arranged on the edges 8, and therefore the points arranged on the edges 8 are referred to as edge vertices 30. Furthermore, points where the vertices 22 of the deleted edge polygons 4A were present are represented by the locations of the vertices of adjacent polygons 4 that share vertices with the deleted edge polygons 4A, which remain in the post-conversion object 2 after the edge polygons 4A have been deleted. Hereinafter, locations where the vertices 22 of the deleted edge polygons 4A were present will be referred to as the vertices 22 of the deleted edge polygons 4A.

As an example, the CPU 12A sets the intervals between the edge vertices 30 as the voxel pitch; however, the intervals between the edge vertices 30 are not restricted thereto. The intervals between the edge vertices 30 may be set to be longer than the voxel pitch in a case where it is desirable for the number of polygons 4 constituting the post-conversion object 2 to be reduced, and the intervals between the edge vertices 30 may be set to be shorter than the voxel pitch in a case where the shapes of the edges 8 are to be accurately reproduced.

It can be said that a branching point of an edge 8 where one edge 8 branches into multiple edges 8 is a location where the shape of the object 2 starts to change into a shape that is different from before. Consequently, in a case where there is a branching point of an edge 8, the CPU 12A arranges an edge vertex 30 at the branching point of the edge 8. Thus, the shape of the edge 8 in the post-conversion object 2 can be accurately reproduced compared to the case where edge vertices 30 are not arranged at the branching points of edges 8. Furthermore, for the same reason, the CPU 12A is not restricted to the branching points of edges 8 and may arranges edge vertices 30 at the intersecting points of edges 8.

It should be noted that in a case where newly arranged polygons 4 intersect, invert, or overlap when the CPU 12A reproduces the shapes of the edges 8, the arranging of the new polygons 4 may be temporarily stopped, and the intervals between the edge vertices 30 may be adjusted, and the arrangement destination of the vertices of the newly arranged polygons 4 may be altered to other edge vertices 30, such that the newly arranged polygons 4 do not intersect, inverse, or overlap. In addition, the CPU 12A may change the arrangement order of the newly arranged polygons 4.

To determine whether the polygons 4 intersect, invert, or overlap, it is sufficient for a publicly-known determination method such as the Bentley-Ottmann method or the Shamos-Hoey method to be used, and the CPU 12A reconfigures the edge polygons 4A by repeatedly arranging the polygons 4 forming the edges 8 such that the polygons 4 do not intersect, invert, or overlap until there are no longer any gaps in the surface of the post-conversion object 2.

Intersecting, inverting, or overlapping of newly arranged polygons 4 and gaps that appear in the surface of the post-conversion object 2 are examples of abnormal locations in the post-conversion object 2; in other words, the CPU 12A configures the edge polygons 4A such that abnormal locations do not occur in the post-conversion object 2.

Figure 19:
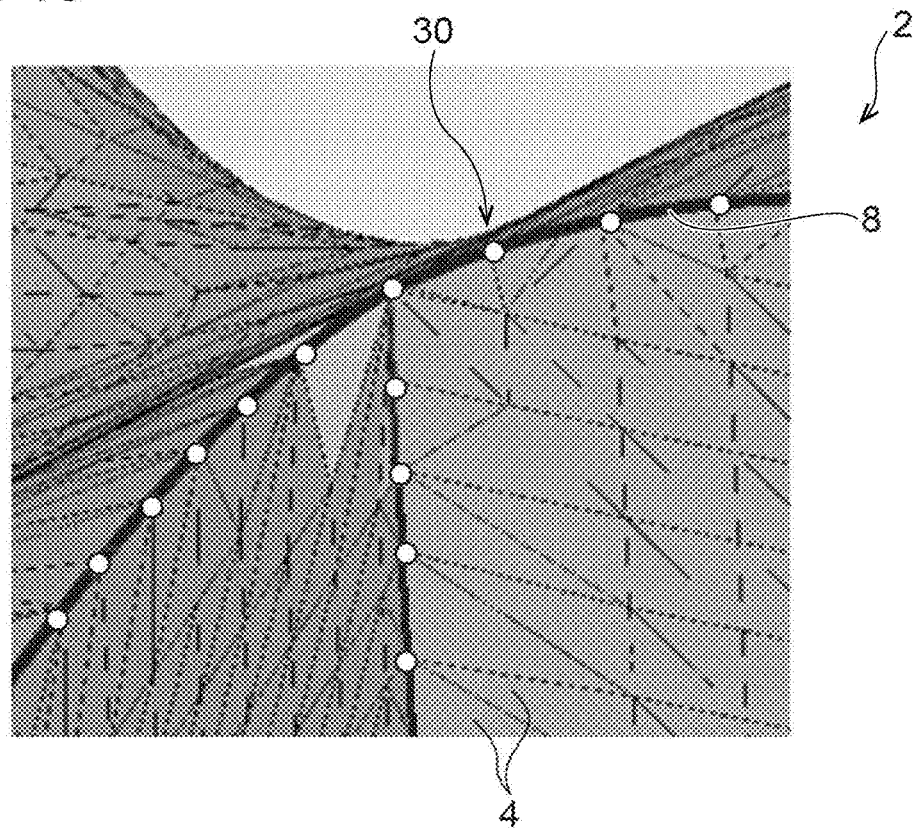
FIG. 19 is a drawing depicting an example in which the deleted edge polygons are reconfigured as new polygons.

FIG. 19 is a drawing depicting an example in which deleted edge polygons 4A such as those depicted in FIG. 18 are reconfigured as new polygons 4. The CPU 12A repeatedly reconfigures the edge polygons 4A until there are no longer any abnormal locations in the post-conversion object 2, thereby reproducing the shapes of the edges 8 of the original object 2.

Thus, the polygon conversion processing depicted in FIG. 9 ends. It should be noted that in the aforementioned polygon conversion, an edge polygon 4A is specified after being converted into a polygon 4 once, the edge polygon 4A is deleted once, and thereafter a new edge polygon 4A is reconfigured. However, the polygon conversion processing is not restricted thereto, and in step S40 in FIG. 9, when three-dimensional shape data representing the pre-conversion object 2 composed of voxels 6 is to be converted into three-dimensional shape data composed of polygon 4, by determining in advance prior to conversion whether or not a post-conversion polygon 4 is an edge polygon 4A and not carrying out conversion into polygons 4 in locations determined as being post-conversion polygons 4, three-dimensional shape data is obtained with edge polygons 4A being deleted in advance, and therefore processing to subsequently delete edge polygon 4A is not required.

Furthermore, edge polygons 4A such as those generated in step S70 may be generated in advance, and processing may be carried out such that steps S50, S60, and S70 in FIG. 9 end at the point in time at which step S40 in FIG. 9 ends. As described above, there are various modified examples for the processing.

Modified Example 1

In the polygon conversion processing depicted in FIG. 9, the CPU 12A extracts edge voxels 6A in step S30, and specifies edge polygons 4A corresponding to edge voxels 6A from among the polygons 4 constituting the post-conversion object 2, on the basis of correspondence information regarding the correspondence between polygons 4 and voxels 6.

However, three-dimensional shape data of the pre-conversion object 2 is not necessarily required in order to specify the edge polygons 4A.

For example, in step S50 in FIG. 9, the CPU 12A may specify polygons 4 of the post-conversion object 2 that are present within a specified range from an edge 8, as edge polygons 4A.

Figure 20:
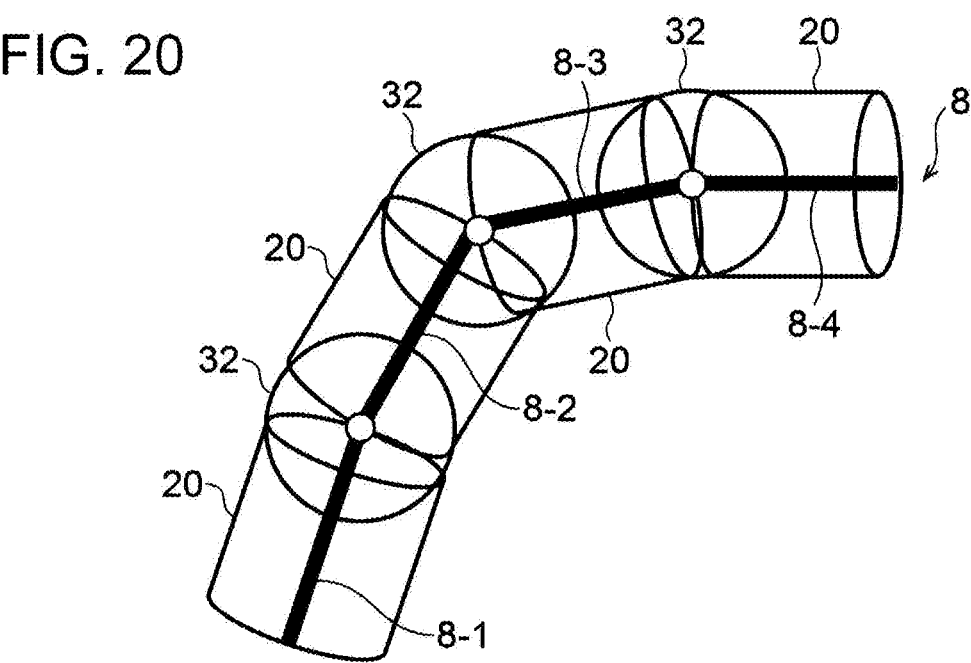
FIG. 20 is a drawing depicting an example of a specified range that is set at the peripheries of edges.

FIG. 20 is a drawing depicting an example of a specified range that is set for an edge 8. In a case where there is an edge 8 in which edges 8-1, 8-2, 8-3, and 8-4 are combined, the specified range is a range represented by: multiple cylinders 20 having a radius r (r being an real number and indicating a distance corresponding to a specified range), the central axes of which are deemed to be the edges 8-1, 8-2, 8-3, and 8-4; and multiple spheres 32 having the radius r, which are centered about the intersecting points of the edge 8. In other words, a polygon 4 being within the specified range refers to a state where a polygon 4 even slightly touches or intersects a cylinder 20 or a sphere 32 that has been set virtually so as to surround an edge 8.

A publicly-known distance measurement method or intersection determination method is used to determine whether or not a polygon 4 is present within the specified range. For example, it is sufficient for the CPU 12A to generate points on edges 8 at intervals that are less than or equal to whichever is the shorter distance out of the voxel pitch and a distance corresponding to the specified range, and to determine whether or not polygons 4 of the post-conversion object 2 are present within the specified range from the positional relationship between the generated points and the polygons 4.

A sphere 32 is set to each intersecting point of the edge 8 in the example depicted in FIG. 20; however, it should be noted that out of the intersecting points of the edge 8, spheres 32 may be set only to branching points of the edge 8 where a gap is more likely to appear between adjacent cylinders 20 compared to other intersecting points due to the external angle exceeding the second reference angle.

Figure 21:
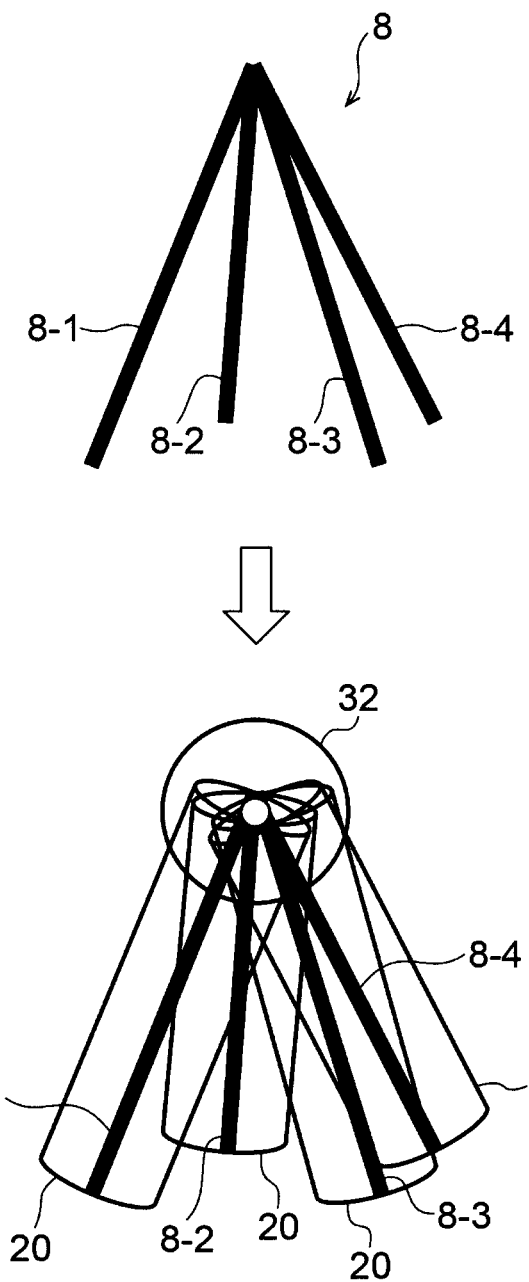
FIG. 21 is a drawing depicting an example of a specified range that is set at the peripheries of edges having a branching point.

For example, FIG. 21 is a drawing depicting an example of a branching point of an edge 8 formed by edges 8-1, 8-2, 8-3, and 8-4. In a case where an edge 8 such as that depicted in FIG. 21 is present, the specified range is indicated by a sphere 32 which is set to the branching point of the edge 8 and cylinders 20 which are set so as to surround the edges 8-1, 8-2, 8-3, and 8-4.

It is sufficient for the CPU 12A to set the specified range with reference to a distance corresponding to the specified range which is stored in advance in the nonvolatile memory 12D, for example; however, the user may change the specified range while confirming the edge polygons 4A specified by the CPU 12A. Furthermore, the CPU 12A may specify a distance corresponding to the specified range from at least one of the length of each edge 8 combined, the number of edges 8 combined, and the distribution and deviation of external angles formed by adjacent edges 8.

If a specified range set in this way is used, edge polygons 4A are specified from the positional relationship between edges 8 and polygons 4 constituting the post-conversion object 2. Consequently, in the polygon conversion processing depicted in FIG. 9, there is no need for the processing of step S30 for extracting edge voxels 6A from the pre-conversion object 2, and there is also no need to generate correspondence information indicating the correspondence between polygons 4 constituting the post-conversion object 2 and voxels 6 constituting the pre-conversion object 2.

Modified Example 2

In the polygon conversion processing depicted in FIG. 9, the CPU 12A deletes edge polygons 4A from the post-conversion object 2 in step S60, and arranges new polygons 4, which replace the edge polygons 4A deleted in step S70, along the edges 8, thereby reconfiguring the edge polygons 4A and reproducing the shapes of the edges 8.

However, the method for reproducing the shapes of the edges 8 in the post-conversion object 2 is not restricted to the aforementioned. Hereinafter, a description will be given regarding a method for reproducing the shapes of the edges 8 of the original object 2 by reconfiguring edge polygons 4A without deleting edge polygons 4A from the post-conversion object 2.

In this modified example, in the polygon conversion processing depicted in FIG. 9, the CPU 12A specifies edge polygons 4A from the post-conversion object 2 in step S50, and thereafter transitions to step S70 without executing step S60.

In step S70, the CPU 12A moves the vertices 22 of the edge polygons 4A specified in step S50, to locations on the edges 8, in order from the vertices 22 of the edge polygons 4A that are in locations near the edges 8, such that abnormal locations do not occur in the post-conversion object 2. Thus, the edge polygons 4A are reconfigured and the shapes of the edges 8 in the original object 2 are reproduced.

For example, if the movement destinations of the vertices 22 of the edge polygons 4A on the edges 8 are set to locations on the edges 8 that are the shortest distance from the locations of the vertices 22 of the edge polygons 4A which are simply moved, the edge polygons 4A are likely to intersect, invert, and overlap. Consequently, the CPU 12A adjusts the movement destinations of the vertices 22 of the edge polygons 4A such that abnormal locations do not occur in the post-conversion object 2.

Furthermore, the CPU 12A may set edge vertices 30 serving as candidates for movement destinations for the vertices 22 of the edge polygons 4A in advance on the edges 8, and move the vertices 22 of the edge polygons 4A specified in step S50, to the edge vertices 30 in order from the vertices 22 of the edge polygons 4A that are in locations near the edges 8. It should be noted that in a case where multiple vertices are moved to the same edge vertex 30 from among three vertices constituting an edge polygon 4A, that edge polygon 4A can be deemed as being unnecessary and be removed.

Figure 22:
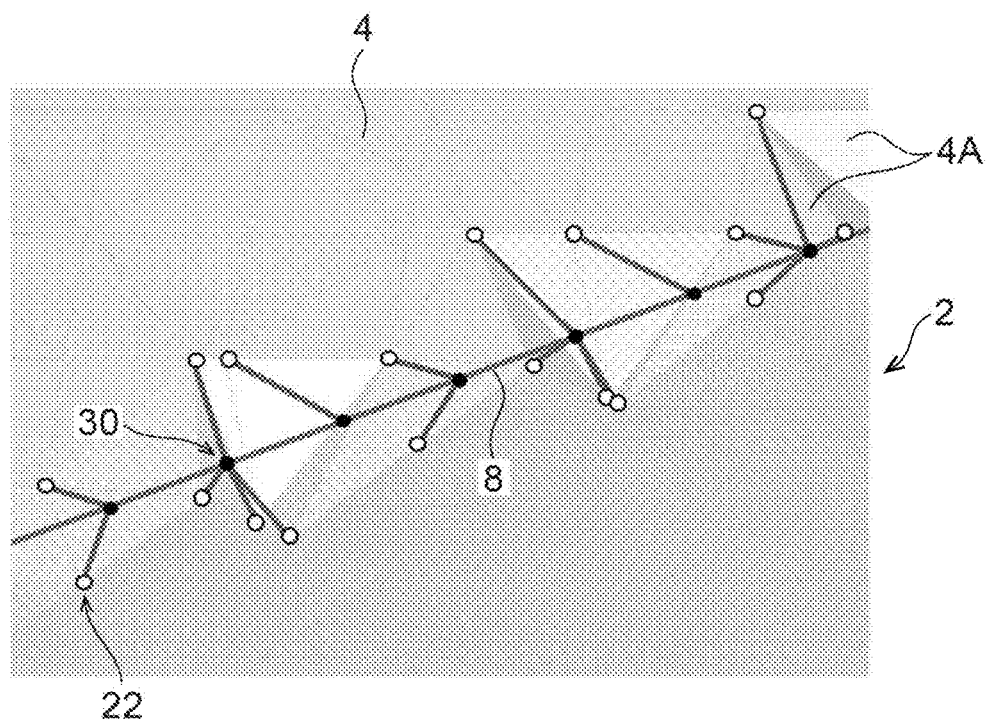
FIG. 22 is a drawing depicting an example in which edge polygons are reconfigured with the vertices of the edge polygons being moved.

FIG. 22 is a drawing depicting an example in which edge polygons 4A are reconfigured with the vertices 22 of edge polygons 4A being moved to edge vertices 30 that are set on an edge 8. In this way, by moving the vertices 22 of the edge polygons 4A to the edge vertices 30 that are in locations closest to the vertices 22 of the edge polygons 4A to modify the shape of the post-conversion object 2, the shapes of the edges 8 of the original object 2 are reproduced.

It should be noted that when reproducing the shapes of the edges 8, in a case where edge polygons 4A intersect, invert, or overlap due to the vertices 22 of the edge polygons 4A being moved onto edges 8, the CPU 12A temporarily stops moving the vertices 22 of the edge polygons 4A, and carries out an adjustment to alter at least one of the intervals or number of the edge vertices 30, the order in which the vertices 22 of the edge polygons 4A are moved, and the edge vertices 30 serving as movement destinations for the vertices 22 of the edge polygons 4A, such that the edge polygons 4A do not intersect, inverse, or overlap.

To determine whether the polygons 4 intersect, invert, or overlap, it is sufficient for a publicly-known determination method such as the Bentley-Ottmann method or the Shamos-Hoey method to be used, with the CPU 12A reconfiguring the edge polygons 4A by moving the vertices 22 of edge polygons 4A onto edges 8 such that the polygons 4 do not intersect, invert, or overlap until there are no longer any gaps in the surface of the post-conversion object 2.

Figure 23:
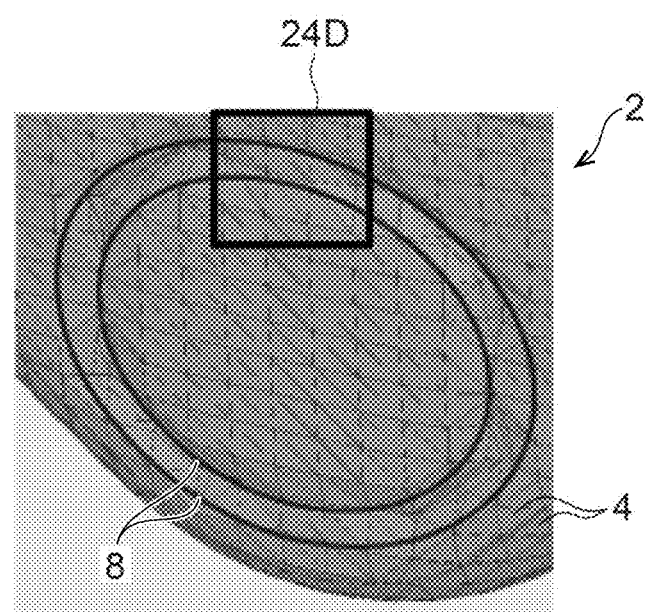
FIG. 23 is a drawing depicting an example of a post-conversion object in which multiple edges are in proximity to each other.

It should be noted that, due to the shape of the original object 2, there are cases where multiple edges 8 are extracted due to being in proximity to each other as depicted in FIG. 23. Edges 8 being in proximity to each other refers to multiple edges 8 being included within a predetermined range, in which edges 8 are deemed as being close and in proximity to each other if included in this range. Hereinafter, the predetermined range used to determine whether edges 8 are in proximity to each other will be referred to as a "proximity range".

When multiple edges 8 are proximate to each other, the same polygon 4 may be specified as an edge polygon 4A for each of the edges 8, and therefore there may be a decrease from the number of edge polygons 4A obtained when the multiple edges 8 are not in proximity to each other. In addition, multiple edges 8 being in proximity to each other indicates a shape that is more complex than a shape formed of one edge 8. Consequently, even if the vertices 22 of the edge polygons 4A are moved onto the edges 8, the number of the vertices 22 of the edge polygons 4A that are moved is insufficient, and thus there is a limit to the shapes of the edges 8 that can be configured and there are cases where the shapes of the edges 8 in the original object 2 are not reproduced.

In such cases, the CPU 12A divides the specified edge polygons 4A to increase the number of edge polygons 4A, and then moves the vertices 22 of the edge polygons 4A onto any of the edges 8 such that abnormal locations do not occur in the post-conversion object 2.

Regarding determining whether or not to divide edge polygons 4A, in a case where the total value of the edge vertices 30 of each edge 8 in the proximity range is greater than the total value of the vertices 22 of the edge polygons 4A within the same proximity range, the CPU 12A treats this as indicating that the shapes of the edges 8 in the original object 2 are not reproduced by merely moving the vertices 22 of the edge polygons 4A currently present, and determines that it is necessary to divide the edge polygons 4A.

It should be noted that the CPU 12A may compare the total value of the edge vertices 30 and the total value of the vertices 22 of the edge polygons 4A with at least one thereof being multiplied by a weighting coefficient. For example, the CPU 12A multiplies the total value of the edge vertices 30 with a value greater than "1" as the weighting coefficient in locations where it is desirable for the shape of an edge 8 to be accurately reproduced. In this case, compared to a weighting coefficient not being multiplied, there is an increase in the probability of it being determined that edge polygons 4A are to be divided, and therefore the shapes of the edges 8 are reproduced more accurately than when a weighting coefficient is not multiplied.

Figure 24:
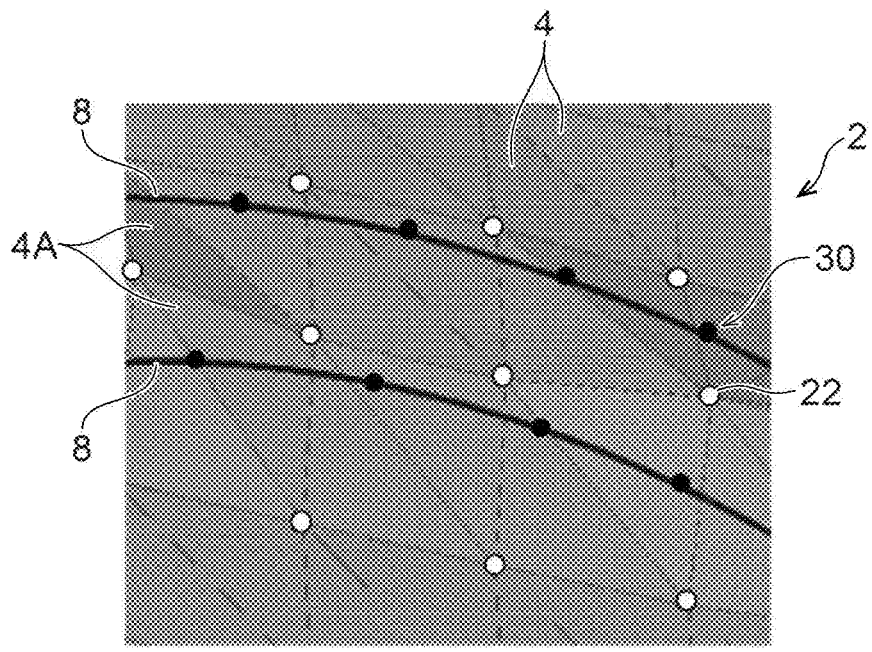
FIG. 24 is an enlarged view in which a state where multiple edges are in proximity to each other is enlarged.

FIG. 24 is an enlarged view of the range of a region 24D in which two edges 8 are in proximity to each other in FIG. 23. As depicted in FIG. 24, edge vertices 30 are set at the voxel pitch, for example, on two edges 8, and edge polygons 4A are present at the periphery of each edge 8.

Figure 25:
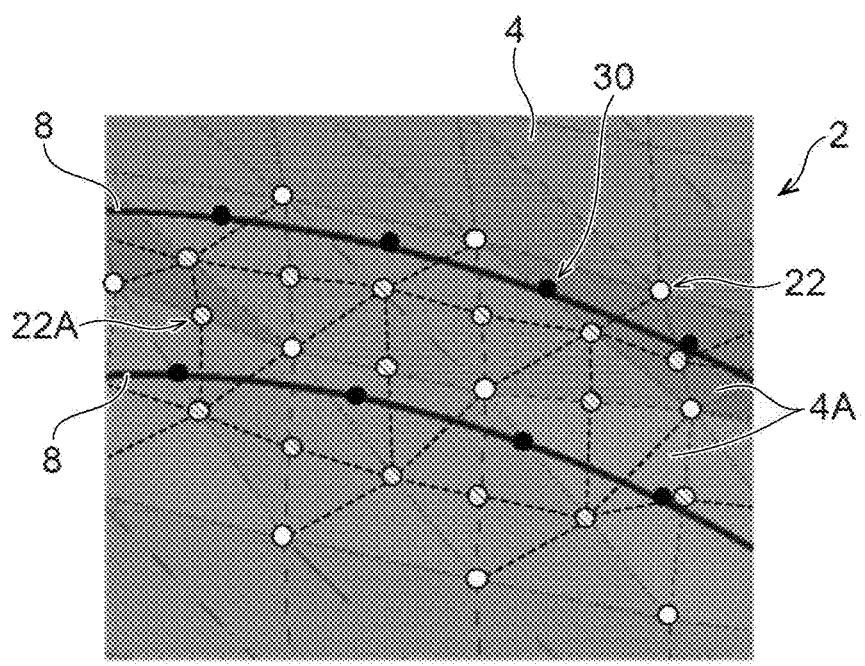
FIG. 25 is a drawing depicting an example of edge polygons being divided.

When having determined that it is necessary to divide the edge polygons 4A, the CPU 12A divides the edge polygons 4A as depicted in FIG. 25, and generates vertices 22A of the edge polygons 4A newly generated due to the division, in addition to the vertices 22 of the edge polygons 4A originally present. Due to the increase in the vertices 22 of the edge polygons 4A, there is an increase in variation in the movement of the vertices 22 of the edge polygons 4A, and therefore the shapes of the edges 8 in the original object 2 are accurately reproduced.

It should be noted that, when dividing the edge polygons 4A, rather than dividing all of the edge polygons 4A, the CPU 12A may carry out dividing in order from the edge polygons 4A having a large area, for example, and stop dividing the edge polygons 4A at the point in time at which the total value of the vertices 22 of the edge polygons 4A becomes greater than or equal to the total value of the edge vertices 30. Specifically, the CPU 12A may stop dividing the edge polygons 4A at the point in time at which the total value of the vertices 22 of the edge polygons 4A becomes greater than or equal to the total value of the edge vertices 30 and the proportion of divided edge polygons 4A reaches a predetermined proportion of the edge polygons 4A included in the proximity range. The proportion of divided edge polygons 4A, even if set by the user, may be obtained from the proportion of the number of edge polygons 4A and the number of edge vertices 30. Furthermore, a value obtained by multiplying the number of edge polygons 4A prior to division by the weighting coefficient that is used when comparing the total number of the vertices 22 of the edge polygons 4A with the total value of the edge vertices 30 may be set as a denominator for this proportion. Furthermore, a proportion that is determined in advance according to the number of edges 8 included in the proximity range may be used.

By suppressing excessive division of the edge polygons 4A in this way, the time required to reconfigure the edge polygons 4A is shortened.

The editing device 10 extracts edges 8 from the original object 2 in step S10 of the polygon conversion processing depicted in FIG. 9; however, edges 8 do not necessarily have to be extracted from the original object 2 by the editing device 10, and the editing device 10 may receive information relating to edges 8 extracted from the original object 2 by another device. Furthermore, in step S40 of the polygon conversion processing depicted in FIG. 9, the editing device 10 converts three-dimensional shape data of the pre-conversion object 2 composed of voxels 6 into three-dimensional shape data composed of polygons 4; however, this conversion does not necessarily have to be carried out by the editing device 10, and the editing device 10 may receive three-dimensional shape data that has been converted into polygons 4 by another device.

Even in a case where there is no three-dimensional shape data that is defined by voxels 6 representing the pre-conversion object 2, it is possible for the editing device 10 to reconfigure the edge polygons 4A with which the shapes of the edges 8 in the original object 2 are reproduced, by receiving three-dimensional shape data that has been converted into polygons 4 from an external device and specifying the edge polygons 4A using the method given in modified example 1.

Hereinabove, the present disclosure has been described using an exemplary embodiment; however, the present disclosure is not restricted to the scope described in the exemplary embodiment. Various alterations or improvements can be added to the exemplary embodiment without deviating from the gist of the present disclosure, and modes obtained by adding such alterations or improvements are also included within the technical scope of the present disclosure. For example, the order of the processing may be altered without deviating from the gist of the present disclosure.

In the exemplary embodiment, a mode in which the polygon conversion processing is realized using software is described as an example; however, processing that is equivalent to the flowchart depicted in FIG. 9 may be implemented by an ASIC (application specific integrated circuit), an FPGA (field programmable gate array), or a PLD (programmable logic device), for example, for the processing to be carried out using hardware. In this case, an increase in processing speed is achieved compared to the case where the polygon conversion processing is realized using software.

In this way, the CPU 12A, which is an example of a general-purpose processor, may be replaced with a dedicated processor that is specifically for specific processing such as an ASIC, an FPGA, a PLD, a GPU (graphics processing unit), and an FPU (floating point unit).

Furthermore, the operation of the processor in the exemplary embodiment may be realized using multiple processors rather than being realized using the single CPU 12A. In addition, the operation of the processor in the exemplary embodiment may be realized by collaboration between processors included in multiple computers 12 in locations that are physically separate.

In the aforementioned exemplary embodiment, a mode is described in which a three-dimensional shape data editing program is installed in the ROM 12B; however, the present disclosure is not restricted thereto. It is also possible for the three-dimensional shape data editing program to be provided in a form recorded on a computer-readable storage medium. For example, the three-dimensional shape data editing program may be provided in a form recorded on an optical disc such as CD (compact disc)-ROM or a DVD (digital versatile disc)-ROM. Furthermore, the three-dimensional shape data editing program may be provided in a form recorded on a portable semiconductor memory such as a USB (universal serial bus) memory or a memory card.

In addition, the editing device 10 may acquire, via the communication unit 18, the three-dimensional shape data editing program according to the present exemplary embodiment, from an external device connected to a communication line.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional shape data editing device comprising a processor configured to,
   with regard to an object represented by a first three-dimensional shape configured using a plurality of forming surfaces of at least one of flat surfaces and curved surfaces, a second three-dimensional shape in which the object is configured using a plurality of three-dimensional elements, and a third three-dimensional shape that is converted from the second three-dimensional shape such that the object is represented by the plurality of forming surfaces,
   specify edge forming surfaces that correspond to edges of the object extracted from the first three-dimensional shape, with respect to the third three-dimensional shape, and
   configure the edge forming surfaces in the third three-dimensional shape such that shapes of the edges of the object represented by the first three-dimensional shape are reproduced.

2. The three-dimensional shape data editing device according to claim 1,
   wherein the processor extracts, as edge three-dimensional elements, the three-dimensional elements constituting the second three-dimensional shape that correspond to the edges of the object, and specifies, as the edge forming surfaces, the forming surfaces in the third three-dimensional shape that have been converted from the extracted edge three-dimensional elements.

3. The three-dimensional shape data editing device according to claim 2,
   wherein the processor deletes the edge forming surfaces from the forming surfaces of the third three-dimensional shape, and reconfigures the edge forming surfaces by connecting vertices arranged on the edges of the object and vertices of the deleted edge forming surfaces, remaining in the third three-dimensional shape after the edge forming surfaces are deleted.

4. The three-dimensional shape data editing device according to claim 1,
   wherein the processor extracts, as the edge forming surfaces, the forming surfaces constituting the third three-dimensional shape that are present within a predetermined range from the edges of the object.

5. The three-dimensional shape data editing device according to claim 1,
   wherein the processor extracts, as edge three-dimensional elements, the three-dimensional elements constituting the second three-dimensional shape that correspond to the edges of the object, and,
   when the second three-dimensional shape is converted into the third three-dimensional shape, in a case where the forming surfaces are configured from the extracted edge three-dimensional elements, configures the edge forming surfaces such that the shapes of the edges of the object are reproduced.

6. The three-dimensional shape data editing device according to claim 1,
   wherein the processor deletes the edge forming surfaces from the forming surfaces of the third three-dimensional shape, and reconfigures the edge forming surfaces by connecting vertices arranged on the edges of the object and vertices of the deleted edge forming surfaces, remaining in the third three-dimensional shape after the edge forming surfaces are deleted.

7. The three-dimensional shape data editing device according to claim 6,
   wherein the processor, in a case where there are edge intersecting points where edges intersect in the edges of the object, reconfigures the edge forming surfaces such that the vertices of the edge forming surfaces after reconfiguration are provided at the edge intersecting points.

8. The three-dimensional shape data editing device according to claim 7,
   wherein the processor treats adjacent edges where an external angle is less than or equal to a predetermined angle as one contiguous edge.

9. The three-dimensional shape data editing device according to claim 6,
   wherein the processor configures the edge forming surfaces such that abnormal locations on the forming surfaces do not occur in the third three-dimensional shape.

10. The three-dimensional shape data editing device according to claim 1, wherein
    the processor reconfigures the edge forming surfaces with vertices of the edge forming surfaces being moved to locations on the edges of the object, in order from the vertices that are in locations near the edges of the object from among the vertices of the edge forming surfaces.

11. The three-dimensional shape data editing device according to claim 10,
wherein the processor, in a case where there is a plurality of the edges of the object within a predetermined range in which edges are deemed to be proximate to each other, divides the edge forming surfaces corresponding to each of the edges of the object, and
reconfigures the edge forming surfaces with the vertices of each of the edge forming surfaces after division being moved to locations on the edges of the object, in order from the vertices that are in locations near the edges of the object.

12. The three-dimensional shape data editing device according to claim 11,
wherein the processor divides the edge forming surfaces corresponding to each of the edges of the object, in a case where a total value of the vertices on each of the edges of the object is greater than a total value of the vertices of the edge forming surfaces corresponding to each of the edges of the object.

13. The three-dimensional shape data editing device according to claim 10,
wherein the processor sets locations of vertices to be movement destinations for the vertices of the edge forming surfaces in advance on the edges of the object, and
reconfigures the edge forming surfaces with the vertices of the edge forming surfaces being moved to the locations of the vertices that have been set on the edges of the object, for each vertex that has been set on the edges of the object, in order from the vertices of the edge forming surfaces that are in locations near the vertex.

14. A three-dimensional shape data editing device comprising a processor configured to,
with regard to a first three-dimensional shape configured using a plurality of forming surfaces of at least one of flat surfaces and curved surfaces, and a second three-dimensional shape in which an object represented by the first three-dimensional shape is configured using a plurality of three-dimensional elements, convert the second three-dimensional shape into a third three-dimensional shape represented by the forming surfaces,
extract edges of the object from the first three-dimensional shape,
specify edge forming surfaces that correspond to the extracted edges of the object, from among the forming surfaces in the third three-dimensional shape after conversion, and
configure the edge forming surfaces of the third three-dimensional shape such that shapes of the edges of the object represented by the first three-dimensional shape are reproduced.

15. The three-dimensional shape data editing device according to claim 14,
wherein the processor extracts, as edge three-dimensional elements, the three-dimensional elements constituting the second three-dimensional shape that correspond to the edges of the object, and specifies, as the edge forming surfaces, the forming surfaces in the third three-dimensional shape that have been converted from the extracted edge three-dimensional elements.

16. The three-dimensional shape data editing device according to claim 15,
wherein the processor deletes the edge forming surfaces from the forming surfaces of the third three-dimensional shape, and reconfigures the edge forming surfaces by connecting vertices arranged on the edges of the object and vertices of the deleted edge forming surfaces, remaining in the third three-dimensional shape after the edge forming surfaces are deleted.

17. The three-dimensional shape data editing device according to claim 14,
wherein the processor extracts, as the edge forming surfaces, the forming surfaces constituting the third three-dimensional shape that are present within a predetermined range from the edges of the object.

18. The three-dimensional shape data editing device according to claim 14,
wherein the processor extracts, as edge three-dimensional elements, the three-dimensional elements constituting the second three-dimensional shape that correspond to the edges of the object, and,
when the second three-dimensional shape is converted into the third three-dimensional shape, in a case where the forming surfaces are configured from the extracted edge three-dimensional elements, configures the edge forming surfaces such that the shapes of the edges of the object are reproduced.

19. The three-dimensional shape data editing device according to claim 14,
wherein the processor deletes the edge forming surfaces from the forming surfaces of the third three-dimensional shape, and reconfigures the edge forming surfaces by connecting vertices arranged on the edges of the object and vertices of the deleted edge forming surfaces, remaining in the third three-dimensional shape after the edge forming surfaces are deleted.

20. A non-transitory computer readable medium storing a three-dimensional shape data editing program causing a computer to execute a process comprising:
with regard to a first three-dimensional shape configured using a plurality of forming surfaces of at least one of flat surfaces and curved surfaces, and a second three-dimensional shape in which an object represented by the first three-dimensional shape is configured using a plurality of three-dimensional elements, converting the second three-dimensional shape into a third three-dimensional shape represented by the forming surfaces;
extracting edges of the object from the first three-dimensional shape;
specifying edge forming surfaces that correspond to the extracted edges of the object, from among the forming surfaces in the third three-dimensional shape after conversion; and
configuring the edge forming surfaces of the third three-dimensional shape such that shapes of the edges of the object represented by the first three-dimensional shape are reproduced.

* * * * *